United States Patent
Hamada et al.

[11] Patent Number: 6,035,146
[45] Date of Patent: Mar. 7, 2000

[54] FILM TRANSPORT IN CAMERA CAPABLE OF SWITCHING PICTURE SIZE

[75] Inventors: Hisashi Hamada; Tokuji Sato, both of Asaka, Japan

[73] Assignee: Fuji Photo Film Co., Ltd., Kanagawa, Japan

[21] Appl. No.: 09/121,859

[22] Filed: Jul. 24, 1998

[30] Foreign Application Priority Data

| Jul. 25, 1997 | [JP] | Japan | 9-200420 |
| Aug. 28, 1997 | [JP] | Japan | 9-232044 |
| Sep. 3, 1997 | [JP] | Japan | 9-238390 |

[51] Int. Cl.$^7$ .................................. G03B 1/00
[52] U.S. Cl. ..................... 396/395; 396/435; 396/436
[58] Field of Search ........................ 396/387, 395–400, 396/418, 435, 436

[56] References Cited

U.S. PATENT DOCUMENTS

| 5,086,311 | 2/1992 | Naka et al. ............. 354/195.1 |
| 5,255,030 | 10/1993 | Mukai et al. ............. 354/94 |
| 5,305,051 | 4/1994 | Irie et al. ............. 354/441 |
| 5,678,081 | 10/1997 | Tanaka ............. 396/435 X |
| 5,749,012 | 5/1998 | Kodaira ............. 396/435 |

FOREIGN PATENT DOCUMENTS

| 5-72655 | 3/1993 | Japan | G03B 37/00 |
| 5-127213 | 5/1993 | Japan | G03B 1/60 |
| 8-106123 | 4/1996 | Japan | G03B 17/28 |
| 2 283 578 | 5/1995 | United Kingdom | G03B 37/00 |

OTHER PUBLICATIONS

Patent Abstracts of Japan vol. 017, No. 402 (P–1580) Jul. 27, 1993 & JP 05 072655 A (Cannon Inc) Mar. 26, 1993 *Abstract.

*Primary Examiner*—Howard B. Blankenship
*Attorney, Agent, or Firm*—Sughrue, Mion, Zinn, Macpeak & Seas, PLLC

[57] ABSTRACT

A light shielding member is composed of plural light shielding plates which increase and decrease an opening area by shielding an exposure opening at least partially, and at least two light shielding plates overlap each other to move from the exposure opening. The film is positioned in such a way that the film is transported in the same direction (feeding direction) when the normal size is switched to the panoramic size and vice versa. Even if the number of residual frames in the panoramic size is 0, the photography in the normal size is allowed when the photography is possible in the normal size. A display shows that the photography can be performed in the normal size, or the panoramic size is automatically switched to the normal size.

3 Claims, 19 Drawing Sheets

F I G. 1 6
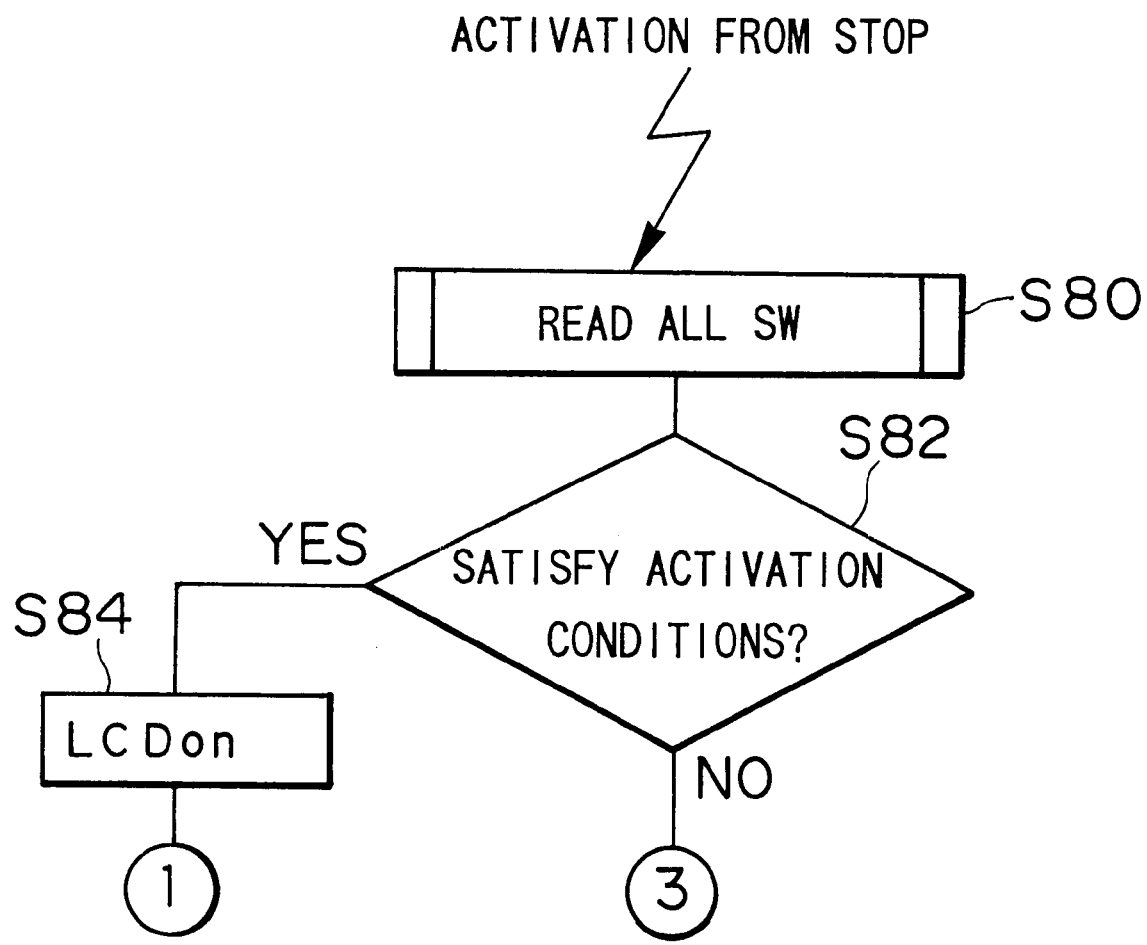

F I G. 2 0
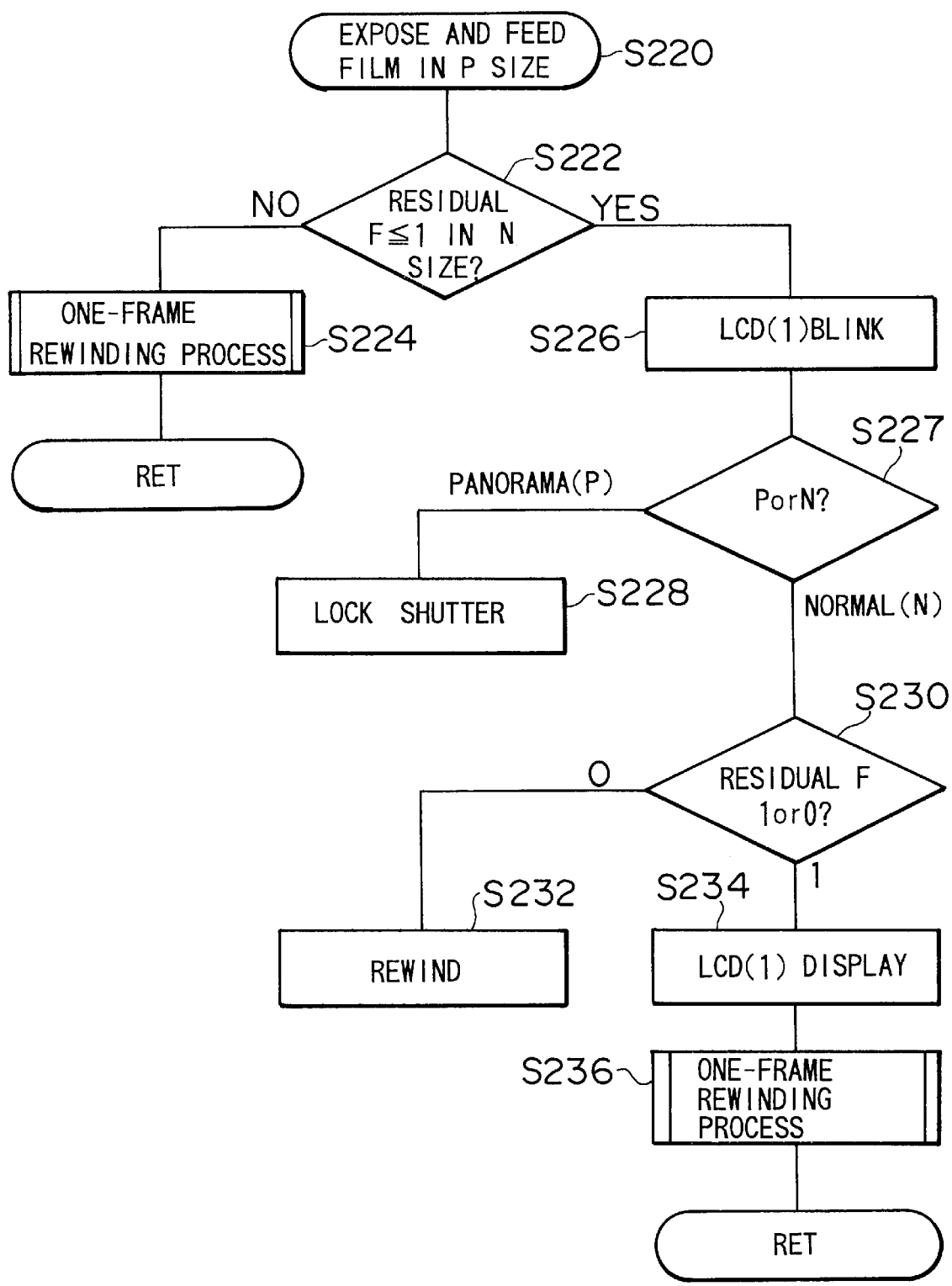

FILM TRANSPORT IN CAMERA CAPABLE OF SWITCHING PICTURE SIZE

BACKGROUND OF THE INVENTION

1. Field of the Invention

The present invention relates generally to a camera which is capable of switching a picture size, and more particularly to a camera which is capable of switching the picture size between a normal size and a size which is larger than the normal size in a film feed direction, and which varies the film feed amount in accordance with the picture size.

2. Description of Related Art

A camera, which is capable of switching the picture size between the normal size and the panoramic size within a film, has recently been put into practical use. On a 35 mm film, the upper and lower sections of the frame in the normal size are shielded properly, and the photograph is enlarged to be in a panoramic size (Japanese Patent Provisional Publication No. 5-72655). The quality of such a panoramic photograph is deteriorated because the enlargement scale is larger than in the normal size.

On the other hand, there is proposed a camera which extends the longer side of a frame in the normal size on the film so that the frame can be, for example, 24 mm×65 mm in the panoramic size (Japanese Patent Provisional Publication No. 8-106123).

The above-mentioned cameras must have a structure wherein the size of an aperture provided behind a taking lens is equal to that of a frame in the panoramic size, and the right and left sections of the aperture are shielded properly to perform the photography in the normal size.

In this case, the size of the opening in the aperture arranged behind the taking lens is equal to that of the frame in the panoramic size, and there are provided light shielding plates at the right and left sections of the aperture to switch the picture size. The light shielding plates slide within a plane parallel to an opening plane of the aperture.

The above-mentioned mechanism has a disadvantage because it requires a space into which the light shielding plate moves from the opening, and thus, the camera must be wide.

The conventional camera which is capable of switching the picture size between the normal size and the panoramic size, has a problem in that the film position must be corrected when the picture size is switched after the film is set by automatic one-frame winding, because the film feed amount varies according to the picture size.

According to the Japanese Patent Provisional Publication No. 8-106123, when the picture size is switched to the panoramic size while the photography in the normal size is waited, the film is further fed and stopped at a position for the panoramic size. On the other hand, when the picture size is switched to the normal size while the photography in the panoramic size is waited, the film is rewound and stopped at a position for the normal size. In this method, the film is positioned both in the film feed direction and in the film rewind direction, and therefore, the film cannot be positioned accurately due to the effects of a transport error resulting from the backlash of a film driving force transmission mechanism and an error in detection of perforations, etc.

Moreover, the conventional camera which is capable of switching the picture between the normal size and the panoramic size has a problem in that the number of residual frames differs according to the selected picture size because the film feed amount varies according to the picture size. Japanese Patent Provisional Publication No. 5-127213 discloses a camera which switches the display of the number of residual frames in response to the switching of the picture size, but it fails to disclose a process for the last frame.

SUMMARY OF THE INVENTION

The present invention has been developed under the above-described circumstances, and the first object of the present invention is to provide a camera which is capable of switching a picture size and reducing the area into which the light shielding plate, which expands and reduce the exposure opening, moves so that the camera can be compact.

The second object of the present invention is to provide a camera which is capable of switching the picture size, the camera which is able to accurately position the film at such a position as to enable the photography in the set size.

The third object of the present invention is to provide a camera which is capable of switching the picture size, the camera which is able to perform a proper processing in accordance with the setting of the picture size for the last frame on the film.

To achieve the first object, the present invention is directed to the camera which has an aperture provided with an exposure opening, and a light shielding member capable of moving in and from at least a part of the exposure opening, the camera capable of switching the size of a photographic frame exposed on a film, the camera wherein: the light shielding member is composed of at least two light shielding plates movable on a plane parallel to an opening plane of the aperture, the light shielding plates being arranged serially to shield a part of the exposure opening, the two light shielding plates being overlapped at least partially to move from the exposure opening.

According to the present invention, in order to take a picture in a smaller size than the exposure opening formed in the aperture, the light shielding member composed of at least two light shielding plates moves in the exposure opening, and the light shielding plates are arranged serially to shield a part of the exposure opening. In another case, in order to take a picture in the same size as the exposure opening formed in the aperture, if the light shielding member moves from the exposure opening. Since at least two light shielding plates partially overlap each other to move from the exposure opening, it is possible to reduce a space into which the light shielding member moves.

The present invention may be applied to the camera which is provided with the focal plane shutter. With the above-mentioned aperture frame and the focal plane shutter, the camera can switch the picture size.

The present invention may be applied to a camera which is capable of switching the size of a photographic frame exposed on the film between a normal size and a panoramic size which is larger than the normal size in a film feed direction. In this case, an exposure opening for the panoramic size is formed in the aperture, and a light shielding member shields the right and left part of the exposure opening. The light shielding member may be provided at least one of the right section and the left section of the exposure opening.

To achieve the above-mentioned second object, the present invention is directed to the camera capable of switching an picture size of a photographic frame exposed on a film between a first size and a second size which is larger than the first size in a film feed direction; the camera comprising: setting means for setting the picture size; transport means for transporting the film forward and backward with drive of a motor; automatic feed control means for controlling the transport means to transport the film forward by a film feed amount suitable for the picture sizeet by the setting means and set the film at a position to enable photography in the set picture size; and picture size changeover feed control means for controlling the transport means to transport the film forward to position the film at such a position as to enable photography in the second size if the setting means changes the picture size to the second size, and for transporting the film backward and then forward to position the film at such a position as to enable photography in the first size if said setting means changes the picture size to the first size in the state wherein the film is set at such a position to enable photography in the second size.

Specifically, the size changeover feed control means controls the transport means in such a way that the film is transported forward by a shortage feed amount equivalent to ½ of a difference in film feed amount between the first size and the second size if the setting means changes the picture size to the second size in the state wherein the film is set at such a position as to enable photography in the first size, and the film is transported backward by a larger amount than an excessive feed amount equivalent to ½ of a difference in feed amount between the first size and the second size and then the film is transported forward to be positioned at such a position as to enable photography in the first size if the setting means changes the picture size to the first size in the state wherein the film is set at such a position as to enable photography in the second size in the state wherein the film is set at such a position as to enable photography in the second size.

According to the present invention, if the setting means sets the first size, the automatic feed control means controls the transport means to transport the film and set the film at such a position as to enable photography in the first size. Every time the exposure is completed, the automatic feed control means transports the film forward by a film feed amount conforming to the first size as to enable photography for the next frame.

If the picture size is switched to the second size when the photography in the first size is possible, the picture size changeover feed control means controls the transport means to transport the film by a shortage of the film feed amount with respect to such a position as to enable photography in the second size. Then, the film is stopped at such a position as to enable photography in the second size, and the camera is ready for the next photography in the second size.

On the other hand, if the setting means sets the second size, the automatic feed control means controls the transport means to transport the film and set the dukn position at such a position as to enable photography in the second size. Every time the exposure is completed, the automatic feed control means transports the film forward by a film feed amount conforming to the second size to enable photography for the next frame.

If the picture size is switched to the first size when the photography in the second size is possible, the picture size changeover feed control means controls the transport means to transport the film back by a larger amount with respect to such a position as to enable the photography in the first size. Then, the film transported forward and stopped at such a position as to enable the photography in the first size. Thus, the camera waits for the next photography in the first size.

As stated above, when the first size is switched to the second size and vise versa, the film is positioned in such a way that the film is transported in the same direction (forward). Thus, the film can be positioned accurately.

The present invention may be applied to the camera which is capable of switching the picture size between, for example, a normal size and a panoramic size which is larger than the normal size in the film feed direction.

To achieve the third object, the present invention is directed to the camera capable of switching an picture size of a photographic frame exposed on a film between a first size and a second size which is larger than the first size in a film feed direction; the camera comprising: picture size setting means for setting the picture size; residual frame counting means for counting the number of residual frames suitable for photography in the set picture size; display means for displaying the number of residual frames conforming to the picture size set by the picture size setting means; and warning means for alerting to the effect that photography is impossible in the second size when the picture size setting means changes the image plane to the second size if the number of residual frames in the first size is one.

According to the present invention, the second size is larger than the first size in the film feed direction, and the second size requires much more amount of the film than the first size. Accordingly, if the number of residual frames in the first size is 1, the film cannot be fed to such an extent as to enable the photography in the second size. In this case, an indication is given to the effect that the photography in the second size is impossible.

This makes it possible to easily determine whether the photography is possible or not for the last frame on the film, and the above-mentioned alerting prompts the user to perform the photography in the first size so that the film can be used effectively.

To achieve the above-mentioned third object, the present invention is directed to the camera capable of switching an picture size of a photographic frame exposed on a film between a first size and a second size which is larger than the first size in a film feed direction; the camera comprising: picture size setting means for setting the picture size; residual frame counting means for counting the number of residual frames suitable for photography in the set picture size; display means for displaying the number of residual frames conforming to the picture size set by the picture size setting means; and photography prohibition means for prohibiting photography in the second size when the picture size setting means changes the picture size to the second size if the number of residual frames in the first size is one.

In order to prohibit the photography, the shutter is locked to prevent the releasing operation.

According to the present invention, if the picture size is switched to the second size when the number of residual frames in the first size is 1, the film cannot be fed to such an extent as to enable the photography in the second size. For this reason, the photography in the second size is prohibited in this case. This makes it possible to prevent a fog from laying partially over the exposed frames on the film.

Furthermore, to achieve the above-mentioned third object, the present invention is directed to the camera capable of switching an picture size of a photographic frame exposed on a film between a first size and a second size which is larger than the first size in a film feed direction; the camera comprising picture size setting means for setting the picture size; residual frame counting means for counting the number of residual frames suitable for photography in the set picture size; display means for displaying the number of residual frames conforming to the picture size set by the picture size setting means; and changeover warning means for alerting to the effect that the picture size cannot switch the picture size to the second size if the number of residual frames in the first size is one.

According to the present invention, if the picture size is switched to the second size when the number of residual frames in the first size is 1, the film cannot be fed to such an extent as to enable the photography in the second size. For this reason, a changeover warning means informs the user that the picture size cannot be changed to the second size. This prevents the picture size from being changed to the second size when the number of residual frames in the first size is 1, and the alerting prompts the user to perform the photography in the first size so that the film can be used effectively.

Furthermore, to achieve the above-mentioned object, the present invention is directed to the camera capable of switching an picture size of a photographic frame exposed on a film between a first size and a second size which is larger than the first size in a film feed direction; the camera comprising: picture size setting means for setting the picture size; residual frame counting means for counting the number of residual frames suitable for photography in the set picture size; display means for displaying the number of residual frames conforming to the picture size set by the picture wherein after the photography in the second size in the state wherein the number of residual frames in the second size is one, the photography in the first size is allowed if there are frames remaining to such an extent as to enable photography in the first size.

According to the present invention, if the photography is performed in the second size when the number of residual frames in the second size is 1, the number of residual frames is decreased to 0, which makes impossible the photography in the second size. Because the second size is larger than the first size, however, the photography in the first size can be performed even if the residual amount on the film is not enough for the photography in the second size. If the photography in the first size is performed, the film can be used effectively.

In this case, there may be additionally provided an information means to notify the user of the possibility of the photography in the first size, and the picture size may be switched to the first size automatically.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 11 shows an example of a visual field observed from the eyepiece part when a 90 mm lens is mounted.

FIG. 12 shows an example of a visual field observed from the eyepiece part when a 90 mm lens is mounted.

FIG. 13 shows an example of a visual field observed from the eyepiece part when a 45 mm lens is mounted.

FIG. 14(a) shows the state of infinity in the case of the normal size, and FIG. 14(b) shows the state of point-bland range in the case of the normal size;

FIG. 16 is a flow chart showing the flow from an activation process from the stationary state;

FIG. 20 is a flow chart of assistance in explaining a process after the panoramic photography.

DETAILED DESCRIPTION OF THE PREFERRED EMBODIMENT

This invention will be described in further detail by way of example with reference to the accompanying drawings. In this embodiment, a description will be given of a camera in which a 35 mm film is used.

Figure 1:
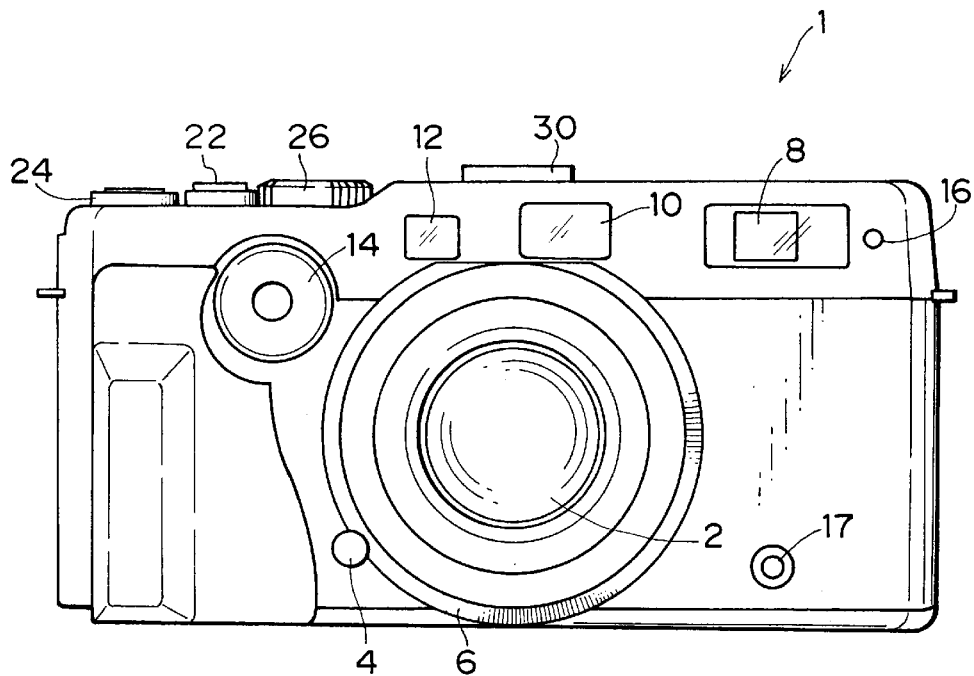
FIG. 1 is a front view of the camera according to the present invention.

FIG. 1 is a front view of the camera according to the present invention. A taking lens is detachably mounted at substantially the center in of the front face of a body of the camera 1. The focal length of the taking lens 2 is changed by exchanging the lenses. A bayonet mount, etc. is employed for a lens mount, so that the lens can be detached from the body of the camera 1 by rotating a lens barrel 6 with an attach and detach button 4 being pressed.

A taking lens with the 90 mm focal length and a taking lens with the 45 mm focal length can be mounted in the camera 1. The focal length is not limited to those.

A finder objective window 8, a light intake window 10 and a rangefinder window 12 are provided at the front of the camera 1. An ISO dial 14 is rotatably arranged at the left side of the rangefinder window 12. In FIG. 1, reference numeral 16 is a self lamp, and 17 is a synchroterminal.

Figure 2:
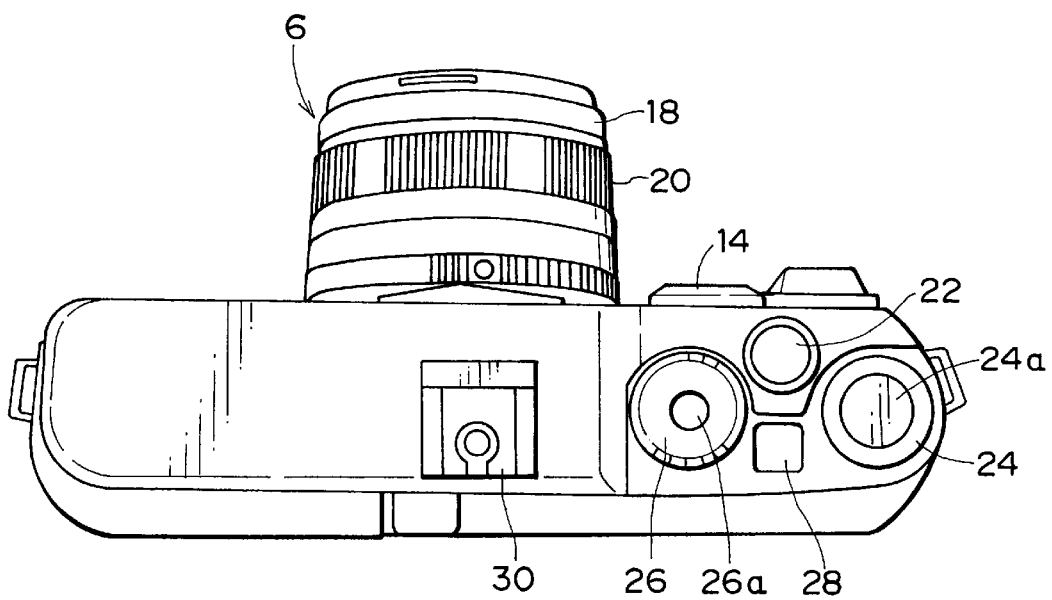
FIG. 2 is a top view of the camera in FIG. 1.

FIG. 2 is a top view of the camera 1. An aperture ring 18 and a distance ring 20 are rotatably provided at the periphery of the lens barrel 6. Rotating the aperture ring 18 adjusts the aperture, and rotating the distance ring 20 adjusts the focus.

A release button 22, a main dial 24, a shutter speed setting dial 26, a film counter (a residual amount display) 28, and a hot shoe 30 are provided at the top of the camera 1.

The main dial 24 serves as both a mode selection dial and a main switch. Rotating the dial from "OFF" turns on the main switch, and sets a photographic mode to a single mode (S), a continuous photography mode (C), and a self mode.

The main dial 24 also serves as an exposure correction dial. Rotating the main dial 24 with a central button 24a being pressed sets the exposure correction of ±2 EV at a step of 0.5 EV.

The camera 1 is provided with an automatic exposure control function which prioritizes the aperture. If the shutter speed setting dial 26 is set to "automatic", the shutter speed is controlled automatically in accordance with TTL photometry. A central button 26a of the shutter speed setting dial 26 serves as a setting lock/cancellation button.

A liquid crystal display is used for the film counter 28 to display the residual exposures of the film. To detect the residual exposures, the total number n of perforations is detected during pre-winding, and the number of residual perforations is counted at each one-frame feeding (in this case, at each one-frame rewinding). The number of residual perforations is divided by the number of perforations required per frame to find the residual exposures.

Specifically, just after a Patrone is mounted, the pre-winding is performed to detect the total number of perforations and the length of the film. Every time the shutter is released to expose the film, the film is rewound into the Patrone by the feeding amount corresponding to the picture size of the exposed frame (8 perforations in the case of the normal size and 14 perforations in the case of the panoramic size). The feeding amount (8 or 14 perforations) is subtracted from the total length of the unexposed area on the film (the total number of perforations) to find the residual length of the film.

The residual length of the film is divided by the one-frame film feed amount (8 or 14 perforations) to find the number of residual frames for each picture size. The number of residual frames is displayed on the film counter 28. To display the number of residual frames in the panoramic size, a character "P" is displayed at the upper left of the number to indicate to the effect.

Only the number of unexposed frames in the picture size for the next photography may be displayed on the film counter 28, or the number of residual frames in the picture size, which is selected by the user's manipulation of a display changeover button (not shown), may be displayed on the film counter 28.

Figure 3:
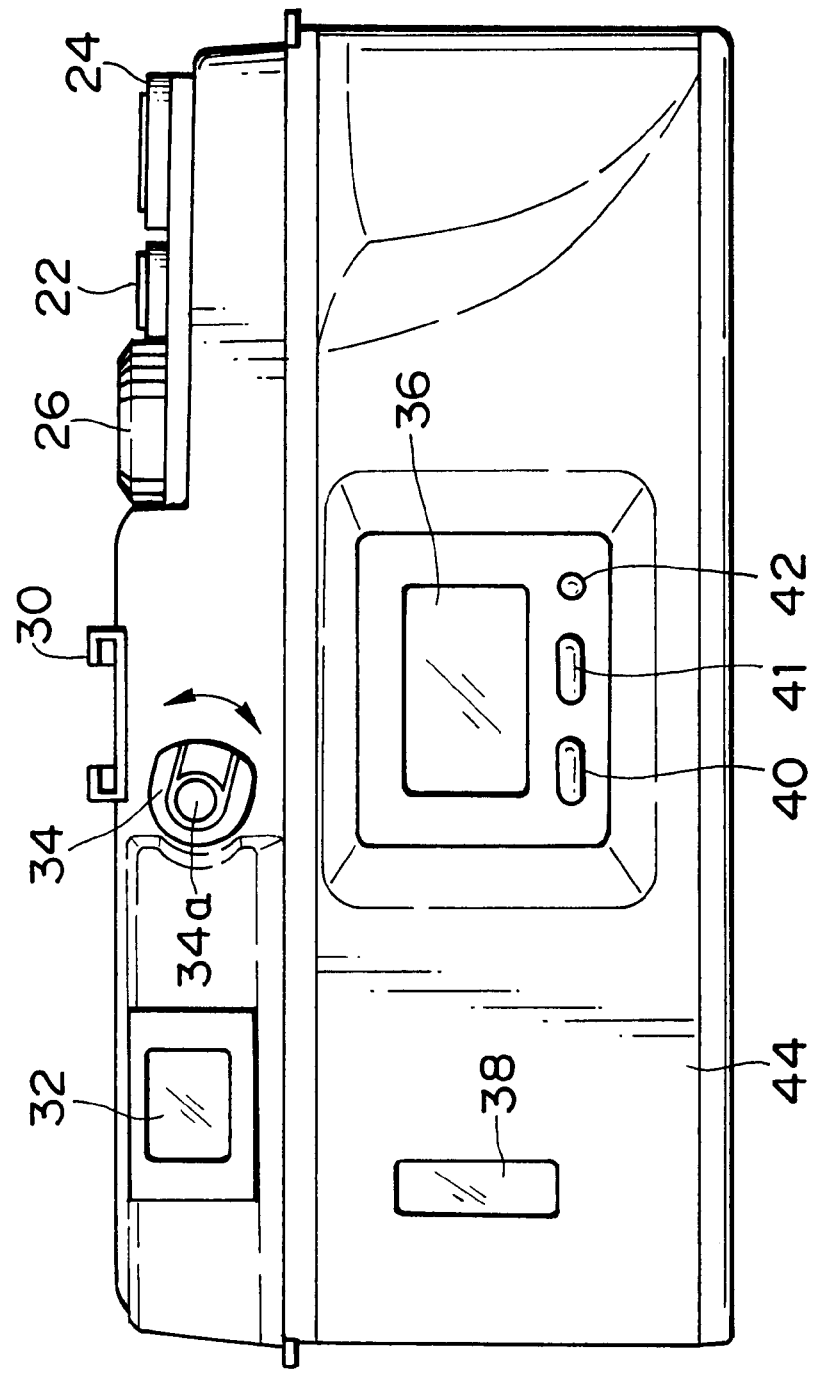
FIG. 3 is a back view of the camera in FIG. 1.

FIG. 3 is a back view of the camera 1. A finder eyepiece 32, an image changing control 34 and a liquid crystal display 36 are provided at the back of the camera 1. Reference numeral 38 is a film confirmation window.

An image changing control 34 is a control member used for changing image patterns in accordance with two print aspect ratios of a normal size and a panoramic size. The image changing control 34 is rotatable about an axis 34a, and it is selectively set to either one of two stop positions corresponding to the normal (N) and panoramic (P) images size.

The liquid crystal display 36 shows information representing the residual battery, the set mode, or the like. An automatic bracket mode selection switch (AEBSW) 40, an EL switch (ELSW) 41 and a halfway rewind switch (MUSW) 42.

The automatic bracket mode selection switch 40 is used to set a photographic mode for taking three pictures sequentially by changing the exposure to correct exposure, underexposure and overexposure. The EL switch 41 is used to turn on and off backlight of the liquid crystal display 36.

A back cover 44 of the camera 1 is opened and closed with support of a hinge (not shown) at the right side in FIG. 3. Manipulating a cover opening lever (not shown) provided at the side of the camera releases the back cover 44 so that the film can be mounted and exchanged. The film used in the camera 1 is, for example, a 35 mm film. A sensor pin (not shown), which detects a camera automatic sensor code (DX code) formed on the wall of the Patrone, is provided within the Patrone of the camera 1. If the ISO dial 14 is set to "DX", information on the ISO sensitivity is read in accordance with the DX code which is automatically sensed by the sensor pin.

Although not shown in the drawings, a battery cover is openably provided at the bottom of the camera 1. Opening the battery cover enables a battery for power supply to be mounted and replaced.

Figure 4:
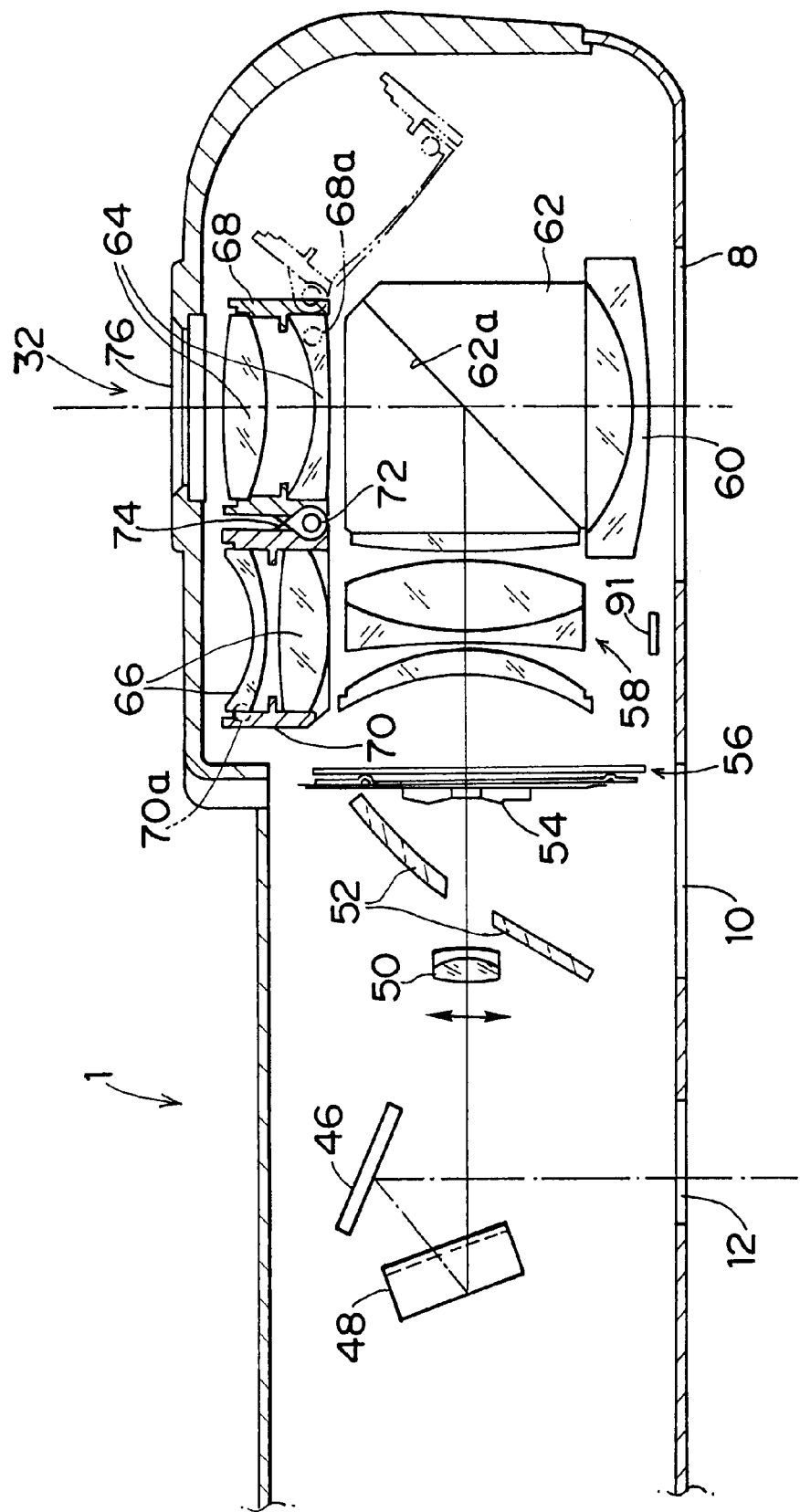
FIG. 4 is a plan view showing the structure of an optical system of a finder incorporated in the camera in FIG. 1.

FIG. 4 is a plan view illustrating the structure of an optical system of a finder which is incorporated in the camera in FIG. 1. The camera 1 is a rangefinder camera which has a bright frame finder using a light intake window system.

The finder part of the camera 1 is composed of an optical system which includes a focusing mirror 46, a focusing roof prism 48, a focusing objective lens 50, a light intake mirror 52, a light intake prism 54, a reticle group 56, a target lens group 58, a convex objective lens 60, a prism 62, an eyepiece lens group 64 of f=45 mm (equivalent to the first eyepiece), an eyepiece lens group 66 of f=90 mm (equivalent to the second eyepiece), or the like. A transmissible coating 62a (a half coating) is formed on the prism 62.

Though the interlocking mechanism of the rangefinder is not illustrated, a ring (a cam) which moves forward and backward along an optical axis in response to the rotation of the distance ring 20 is provided at the back end of the lens barrel 6, and a lever which has a roller abutting on the ring is provided at the camera. The lever swings forward and backward along the optical axis in connection with the forward and backward movement of the ring.

Accordingly, the focusing objective lens 50 moves in a direction perpendicular to the optical axis (vertically in FIG. 4) in accordance with the movement of the lever to move a rangefinder image, and the reticle group 56 moves obliquely to perform a parallax correction. The structure of the reticle group 56 will be described later (see FIG. 7).

Rotating the distance ring 20 of the lens barrel 6 moves the taking lens 2 forward and backward along the optical axis with support of a helicoid and moves the focusing objective lens 50. This changes the corresponding state of upper and lower images of a split image in the finder observed through the finder eyepiece part 32. The taking lens is set at a position where the upper and lower images correspond (a position where a rangefinder image and a finder image correspond).

Two eyepiece groups 64, 66 are held in lens frames 68, 70, respectively, and both lens frames 68, 70 are rotatably connected to one another with support of a connecting pin 72. A spring 74 is provided at a position where the lens frames 68, 70 connect to one another. The lens frame 68 is forced clockwise in FIG. 4 with the connecting pin 72 being the center, and the lens frame 70 is forced counterclockwise with the connecting pin 72 being the cmove in.

Figure 5:
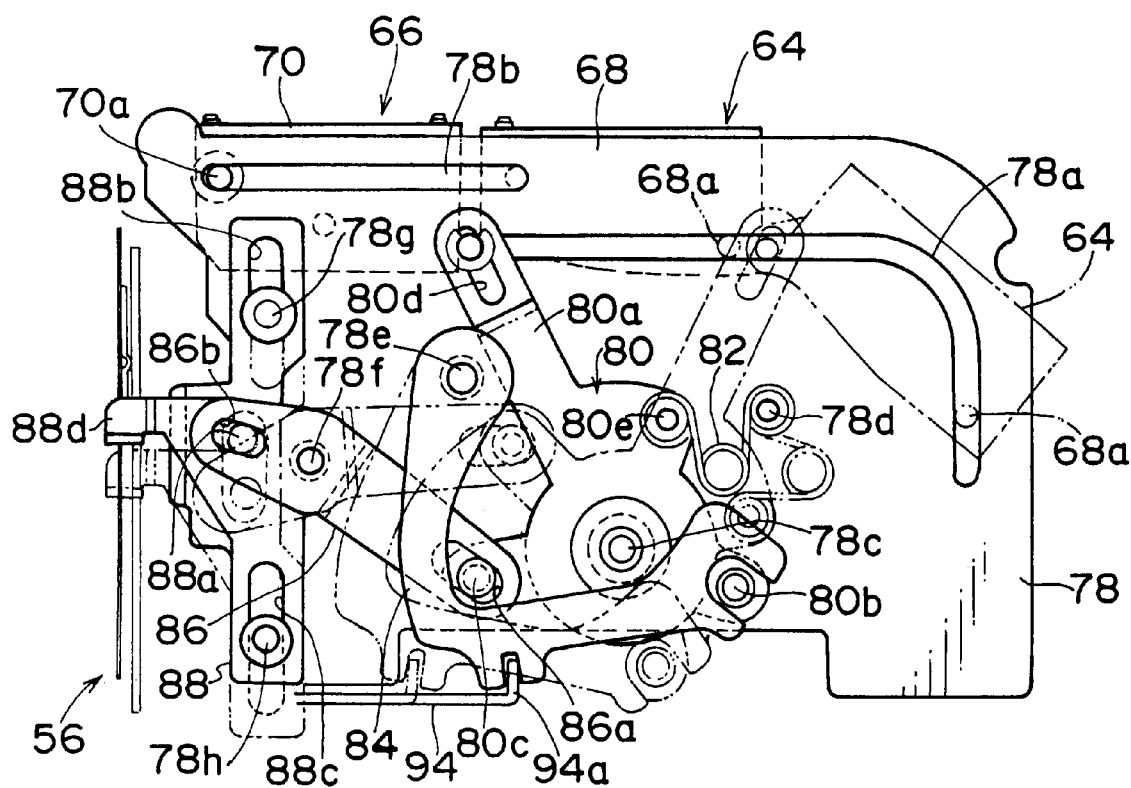
FIG. 5 is a plan view showing a changing mechanism of an eyepiece lens group.

Bosses 68a, 70a project from the top of the lens frames 68, 70, respectively, and the bosses 68a, 70a are inserted in guide grooves 78a, 78b, respectively, of a plate 78 which is arranged above the eyepiece groups 64, 66 (see FIG. 5). Both eyepieces 64, 66 can be movable with guide of bosses 68a, 70a, and the guide grooves 78a, 78b.

A detailed description will be given of a mechanism which slides the eyepiece groups 64, 66. If the f=45 mm taking lens 2 is mounted, the 45 mm eyepiece group 64 is arranged between the prism 62 and an eyepiece window 76 as indicated by a solid line in FIG. 4. The 90 mm eyepiece group 66 moves back into a space at the left side of the 45 mm eyepiece group 64 and behind the target lens group 58. In FIG. 4, the 90 mm eyepiece group 66 moves back into the space behind the target lens group 58, but the present invention is not limited to this. The 90 mm eyepiece group 66 may move back into any space behind a light intake optical system extending from the light intake window 10 to the half transmissible coating (half coating) 62a of the prism 62.

On the other hand, if the 90 mm taking lens 2 is mounted, the 90 mm eyepiece group 66 moves into a space between the prism 62 and the eyepiece window 76 (on the finder optical axis). The 45 mm eyepiece 64 rotates clockwise about the connecting pin 72 and moves back to the side of the camera 1 in the folded state as indicated by long and two short alternate lines.

A description will be given of a changing mechanism of the eyepiece groups.

FIG. 5 is a plan view of the changing mechanism of the eyepiece groups. A plate 78 is placed in such a way as to cover the top of the prism 62 and the eyepiece groups 64, 66. Guide grooves 78a, 78b are formed on the plate 78, and the eyepiece group 64, 66 are moved on the guide grooves 78a, 78b. The guide groove 78a is substantially L-shaped, and the boss 68a of the lens frame 68 for the 45 mm eyepiece group 64 is inserted into the guide groove 78a. On the other hand, the guide groove 78b is straight, and the boss 70a of the lens frame 70 for the 90 mm eyepiece group 66 is inserted into the guide groove 78b.

Four connecting members are mainly supported on the plate 78. The first connecting member 80 is rotatably supported on a shaft 78c of the plate 78. The first connecting member 80 has an arm part 80a and two connecting pins 80b, 80c, and the boss 68a of the lens frame 68 is inserted into a slot 80d of the arm part 80a. A spring hook pin 80e is formed at the first connecting member 80. One end of a spring 82 is hooked on the spring hook pin 80e, and the other end of the spring 82 is hooked on a spring hook pin 78 formed on the plate 78. When the first connecting member 80 is located at a position indicated by a solid line in FIG. 5 (a 45 mm position), the spring 82 forces the first connecting member 80 counterclockwise to press the connecting pin 72 against the left end of the guide groove 78a and position the 45 mm eyepiece group 64 at an observation position.

When the first connecting member 80 rotates to a position (the 90 mm position) indicated by long and two short alternate lines in FIG. 5, the spring 82 forces the first connecting member 80 clockwise to press the boss 70a of the guide groove 78b against the right end of the 90 mm eyepiece group 66 and position the 90 mm eyepiece group 66 at an observation position.

The second connecting member 84 is substantially L-shaped, and it is rotatably supported on a shaft 78e of the plate 78. The end of the second connecting member 84 is substantially U-shaped and is coupled to the connecting pin 80d of the first connecting pin 80. The second connecting member 84 is coupled to an end 94a of a sixth connecting member 94 which will be described later. The second connecting member 94 rotates about the shaft 78e in engagement with the sixth connecting member 94.

The third connecting member 86 is rotatably supported on a shaft 78f formed on the plate 78, and has long and short arms whose fulcrum is the shaft 78f. The connecting pin 80c of the first connecting member 80 is inserted into a slot 86a formed in the longer arm, and the connecting pin 88b of the fourth connecting member 88 is inserted into a slot 86b formed in the shorter arm.

The fourth connecting member 88 has slots 88b, 88c, and connecting pins 78g, 78h of the plate 78 are inserted into the slots 88b, 88c. The fourth connecting member 88 is slidable vertically in the drawing while they are guided by the slots 88b, 88c and the connecting pins 78g, 78g. The fourth connecting member 88 moves vertically in engagement with the rotation of the third connecting member 86.

A lever 88d is formed at the side of the central part of the fourth connecting member 88, and the lever 88d is coupled to a 45 mm/90 mm changeover frame 110 of the reticle group 56, which will be described later, so as to slide the 45 mm/90 mm changeover frame 110 in accordance with the changing of the lenses.

Figure 6:
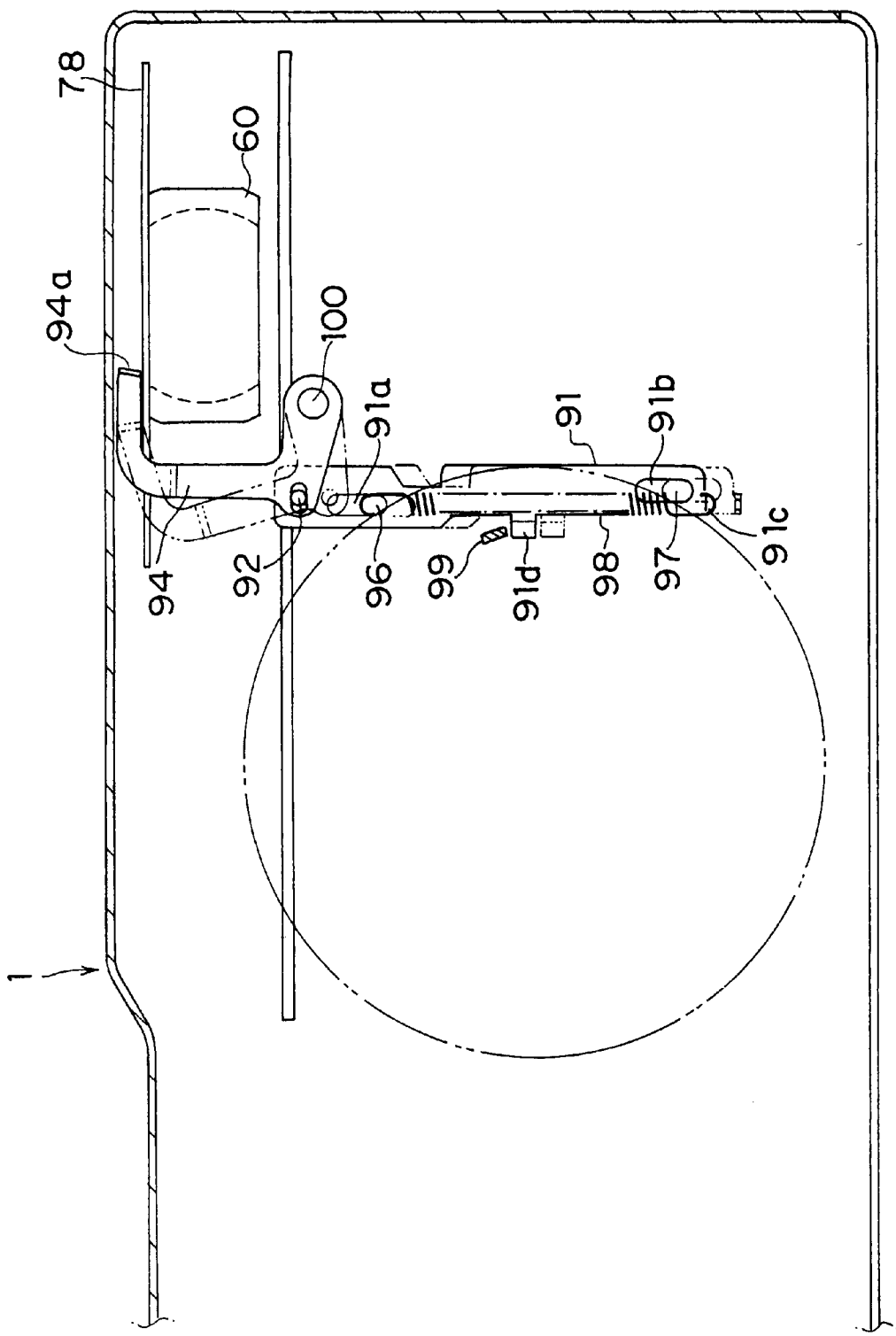
FIG. 6 is a view showing the structure of essential parts at the front of the changing mechanism of the eyepiece lens group.

FIG. 6 shows the essential parts at the front of the changing mechanism of the eyepiece group. As shown in FIG. 6, a fifth connecting member 91, which is movable vertically, and a sixth connecting member 94, which is rotatably connected to the fifth connecting member 91 through a pin 92, are provided at the right side of a mount where the taking lens 2 is mounted.

The fifth connecting member 91 has slots 91a, 91b, and pins 96, 97 of the camera body are inserted into the slots 91a, 91b, respectively. The fifth connecting member 91 is movable vertically in FIG. 5 along a guide which is composed of the slots 91a, 91b and the pins 96, 97. A hook 91c is formed at the bottom end of the fifth connecting member 91, and a spring 98 is stretched between the hook 91c and the pin 96. The spring 98 forces the fifth connecting member 91 upward in FIG. 6.

A projecting piece 91d is formed at the left side of the central portion of the fifth connecting member 91. The projecting piece 91d is coupled to a pawl 99 which is formed at the periphery of the back end of the lens barrel for the f=90 mm taking lens. The lens barrel 6 is not illustrated in FIG. 6, but only the pawl 99 is illustrated.

When the lens barrel for the f=90 mm taking lens 2 rests on the mount of the camera 1 and is tightened clockwise, the pawl 99 presses the projecting piece 91d of the fifth connecting member 91 downward. Consequently, the fifth connecting member 91 moves downward as indicated by long and short alternate lines in FIG. 6.

On the other hand, the pawl 99 is not formed in the lens barrel of the f=45 mm taking lens. If the lens barrel for the f=45 mm taking lens is mounted in the mount of the camera 1, the fifth connecting member 91 moves upward as indicated by a solid line in FIG. 6.

The sixth connecting member 94, which is connected to the fifth connecting member 91 through the pin 92, is rotatably supported on a shaft 100 of the camera body. The sixth connecting member 94 swings with the shaft 100 being the center in engagement with the vertical movement of the fifth connecting member 91. An end 94a of the sixth connecting member 94 is folded toward the back of the camera at approximately 90°. The folded end 94a is coupled to the second connecting member 84 shown in FIG. 5.

A description will be given of the structure of the reticle group 56.

Figure 7:
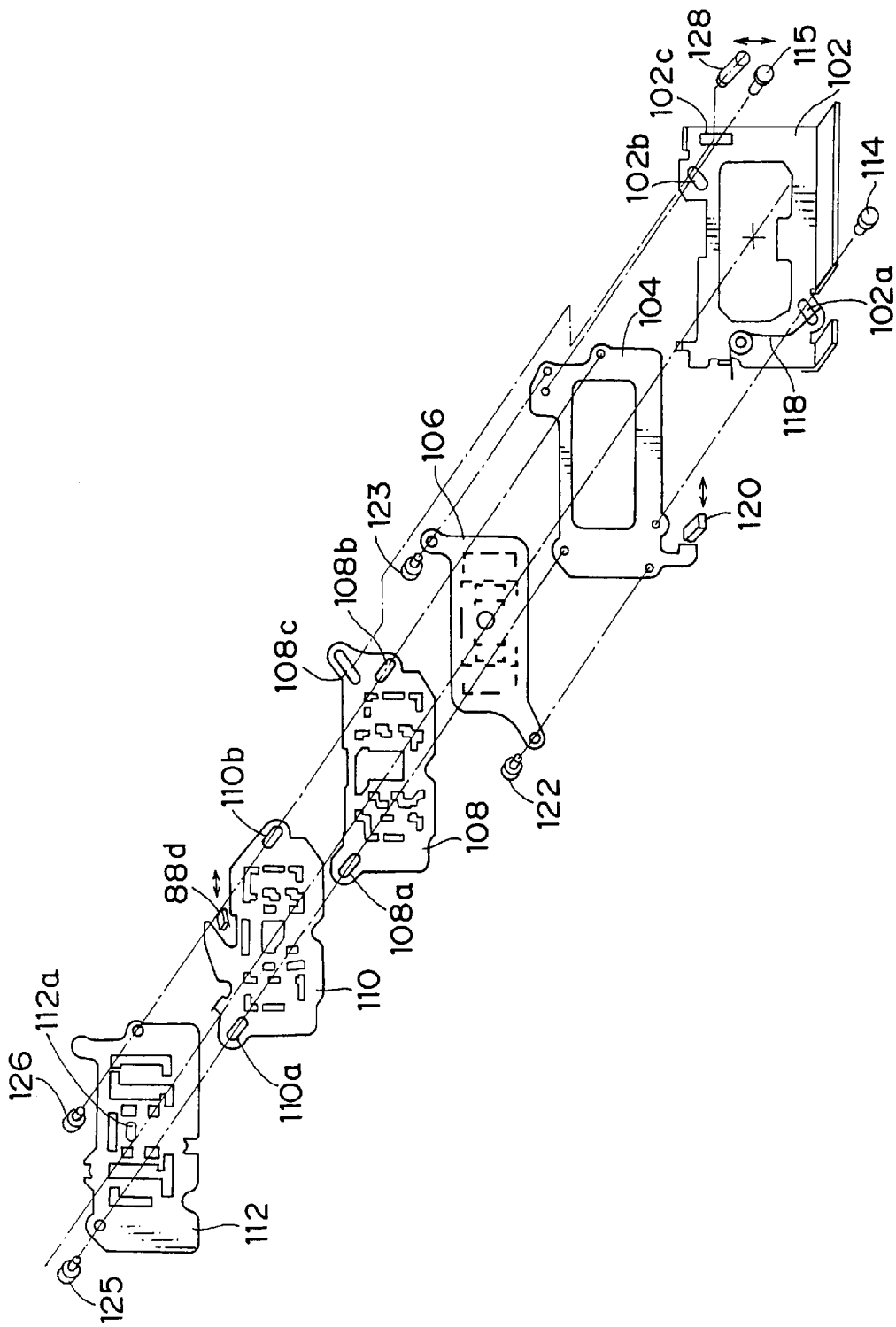
FIG. 7 is a view showing the structure of a reticle group 56 in FIG. 4.

FIG. 7 shows the structure of the reticle group 56 shown in FIG. 4. As shown in FIG. 7, the reticle group 56 consists of a holding frame 102, a moving frame 104, a reticle plate 106, a normal/panorama changeover frame (hereinafter referred to as an N/P changeover frame) 108, a 45 mm/90 mm changeover frame 110 and a pressing frame 112.

The holding frame 102 holds the moving frame 104, the reticle plate 106, or the like. The holding frame 102 is fixed to the body of the camera 1. The moving frame 104 performs the automatic parallax correction in response to the forward and backward movement of the taking lens 2. The moving frame 104 is movable obliquely (diagonally on a picture plane) along a guide which is composed of slots 102a, 102b formed in the moving frame 102 and pins 114, 115.

A spring 118 forces the moving frame 104 upward diagonally to the right in FIG. 7, and the lower left corner of the moving frame 104 is coupled to a lever 120 which moves horizontally in engagement with the pull-out of the taking lens 2. The lower left corner of the moving frame 104 moves diagonally in FIG. 7 in engagement with the movement of the lever 120 with regulation of the guide composed of the pins 114, 115 and the slots 102a, 102b.

An optical image frame which specifies a frame for the f=45 mm taking lens, an optical image frame which specifies a frame for the f=90 mm taking lens, an optical image frame which specifies a frame for the normal size, and an optical image which specifies a frame for the panoramic size are formed on the reticle plate 106, which is fixed to the moving frame 104 with pins 122, 123.

The NP changeover frame 108 is guided diagonally upward to the left in the drawing by a guide which is composed of slots 108a, 108b and pins 125, 126. The NP changeover frame 108 changes the reticles in accordance with the vertical movement of the pin 129 which is inserted into the slot 108c. A description will be given of the driving mechanism 128 for the pin 128 (see FIG. 8).

The 45 mm/90 mm changeover frame 110 is guided by a guide composed of the slots 110a, 110b and the pins 125, 126, and is coupled to the lever 88d of the fourth connecting member 88 described with reference to FIG. 5. The 45 mm/90 mm changeover frame 110 changes the reticles in accordance with the movement (vertically in FIG. 7) of the lever 88d of the fourth connecting member 88.

The pressing frame 112 fixes three members of the reticle plate 106, the NP changeover frame 108 and the 45 mm/90 mm changeover frame 110 between the pressing frame 112 and the moving frame 104.

The pressing frame 112 is attached to the moving frame 104 through the pins 125, 126. A focusing window 112a is formed at substantially the cmove in of the pressing plate 112 so that the split image can be observed through the focusing window 112a.

Accordingly, the 45 mm/90 mm changeover frame 110 moves according to the types of the taking lens 2 mounted in the lens mount of the camera 1, and the NP changeover frame 108 moves in accordance with the picture size which is switched between the normal size and the panoramic size. Consequently, only an optical image frame which satisfies the photographic conditions can be seen. The moving frame 104 moves in engagement with the manipulation of the distance ring 20 of the lens barrel 6.

A description will be given of the changeover means which switches the picture size between the normal size and the panoramic size.

Figure 8:
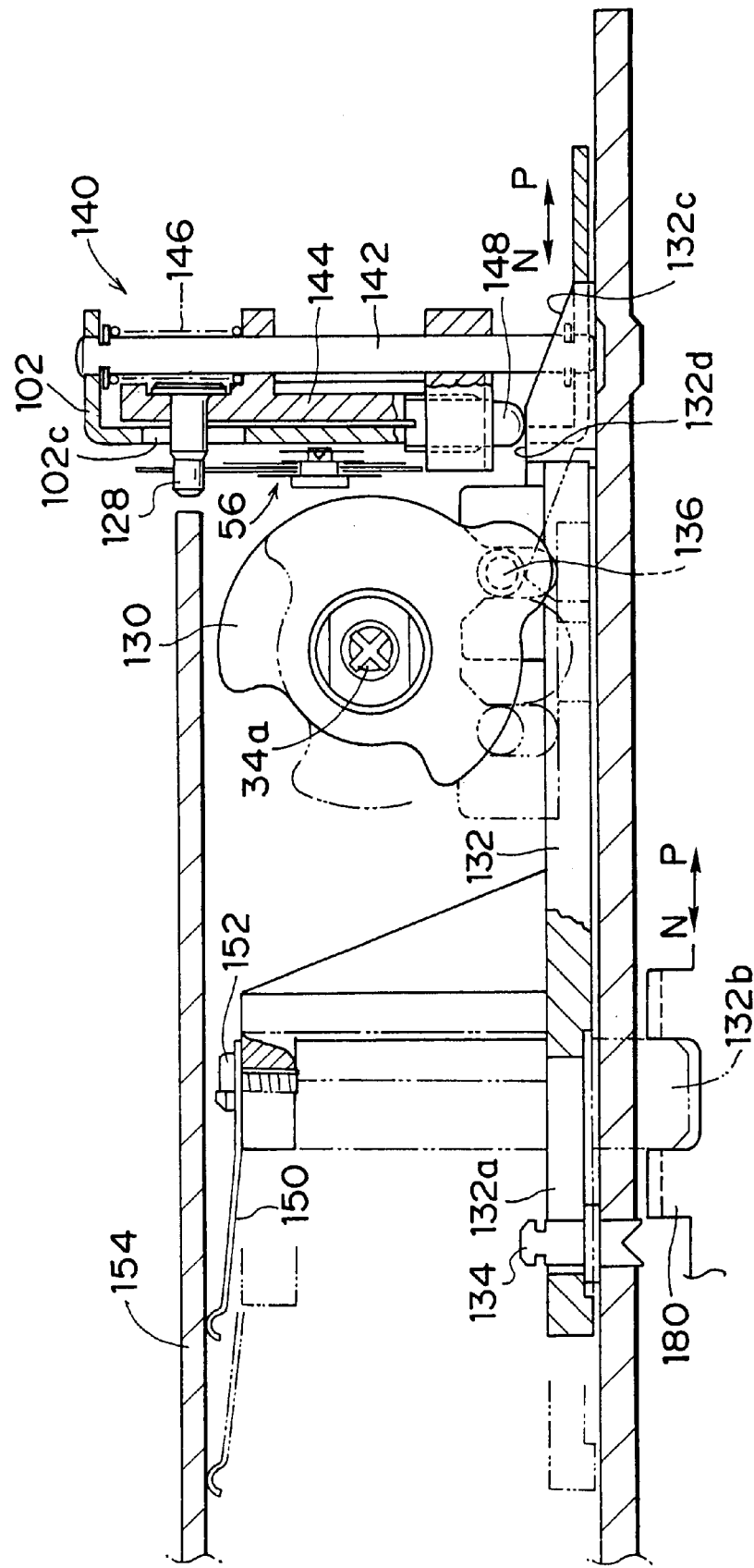
FIG. 8 is a view showing the structure of essential parts at the interior of the camera in FIG. 1.

FIG. 8 shows the inner structure of the camera 1 in the vicinity of the picture plane changeover control 34. Reference numeral 130 is a rotary member which is fixed to the shaft 34a of the picture plane changeover control 34. A first normal/panoramic connecting lever (hereinafter referred to as a first NP connecting lever) 132 is provided below the rotary member 130. The first normal/panoramic connecting member 132 is slidable horizontally in the drawing with guide of the slots 132a and the pin 134.

The first NP connecting lever 132 is connected to the rotary member 130 through a connecting pin 136. The rotation of the picture plane changeover control 34 causes the rotary member 130 to rotate about the shaft 34a so that the first NP connecting lever 132 can move horizontally in the drawing.

A pawl 132b is formed at the bottom of the first NP connecting lever 132, and the pawl 132b is coupled to a second normal/panorama connecting lever (hereinafter referred to as a second NP connecting lever) 180 of an aperture switching mechanism which will be described later so that the operating force of the picture plane changeover control can be transmitted to drive the aperture switching mechanism.

The reticle group 56, which is held in the holding frame 102 described with reference to FIG. 7, is arranged at the right side of the rotary member 130, and the reticle driving mechanism 140 is provided at the right side of the reticle group 56.

The reticle driving mechanism 140 is comprised mainly of a support 142, a lift member 144 and a pin 128. The top and bottom ends of the support 144 are supported by the holding frame 102, and the lift member 144 is supported by the column 142 in such a way as to move vertically. The pin 128 is fixed to the upper part of the lift member 144, and the pin 128 is inserted into the slot 108 formed in the NP changeover frame 108 of the reticle group 56 through a hole 102C of the holding frame 102.

The spring 146 forces the lift member 144 downward in FIG. 8, and a pin 148 is screwed into the bottom end of the lift member 144. The end of the pin 148 projects from the bottom of the lift member 144.

The end of the pin 148 is kept in contact with the right end of the first NP connecting lever 132 by the force of the spring 146. With the slide of the first NP connecting lever 132, the lift member 144 moves vertically due to the operation of an oblique plane 132c of the first NP connecting lever 132. The end of the pin 138 is semi-circular in order to reduce a friction between the oblique plane part 132c and the flat part 132d of the first NP connecting lever 132.

Accordingly, in the panorama size setting indicated by the solid line in FIG. 8, the end of the pin 148 runs onto the flat part 132d of the first NP connecting lever 132, and the lift member 144 is positioned above them. On the other hand, when the normal size is set by rotating the picture plane changeover control 34 clockwise in FIG. 8, the first NP connecting lever 132 slides to the left as indicated by long and two short alternate lines. The pin 138, which is provided at the bottom of the lift member 144, descends along the oblique plane 132c. Thus, the lift member 144 moves downward, and the pin 128, which is fixed to the lift member 144, is driven downward.

As stated above, in accordance with the position to which the picture plane changeover control 34 is rotated, the lift member 144 moves vertically and the pin 128 fixed to the lift member 144 is driven vertically. The driving force of the pin 128 moves the NP changeover frame 108 of the reticle group 56.

Moreover, a metal armature plate 150 is fixed to the upper left of the first NP connecting lever 132 through a screw 152.

The metal armature plate 150 is folded like a leaf spring, and the end of the metal armature plate 150 is forced toward an electric circuit board 154 by the elasticity thereof.

For the reasons stated above, sliding the first NP connecting lever 132 horizontally in engagement with the rotation of the picture plane changeover control 34 changes contact points of the metal armature plate 15, where the metal armature plates 150 contacts, with the electric circuit board 154. It is therefore possible to electrically detect the setting of the normal/panoramic picture size.

A description will be given of the aperture switching mechanism.

Figure 9:
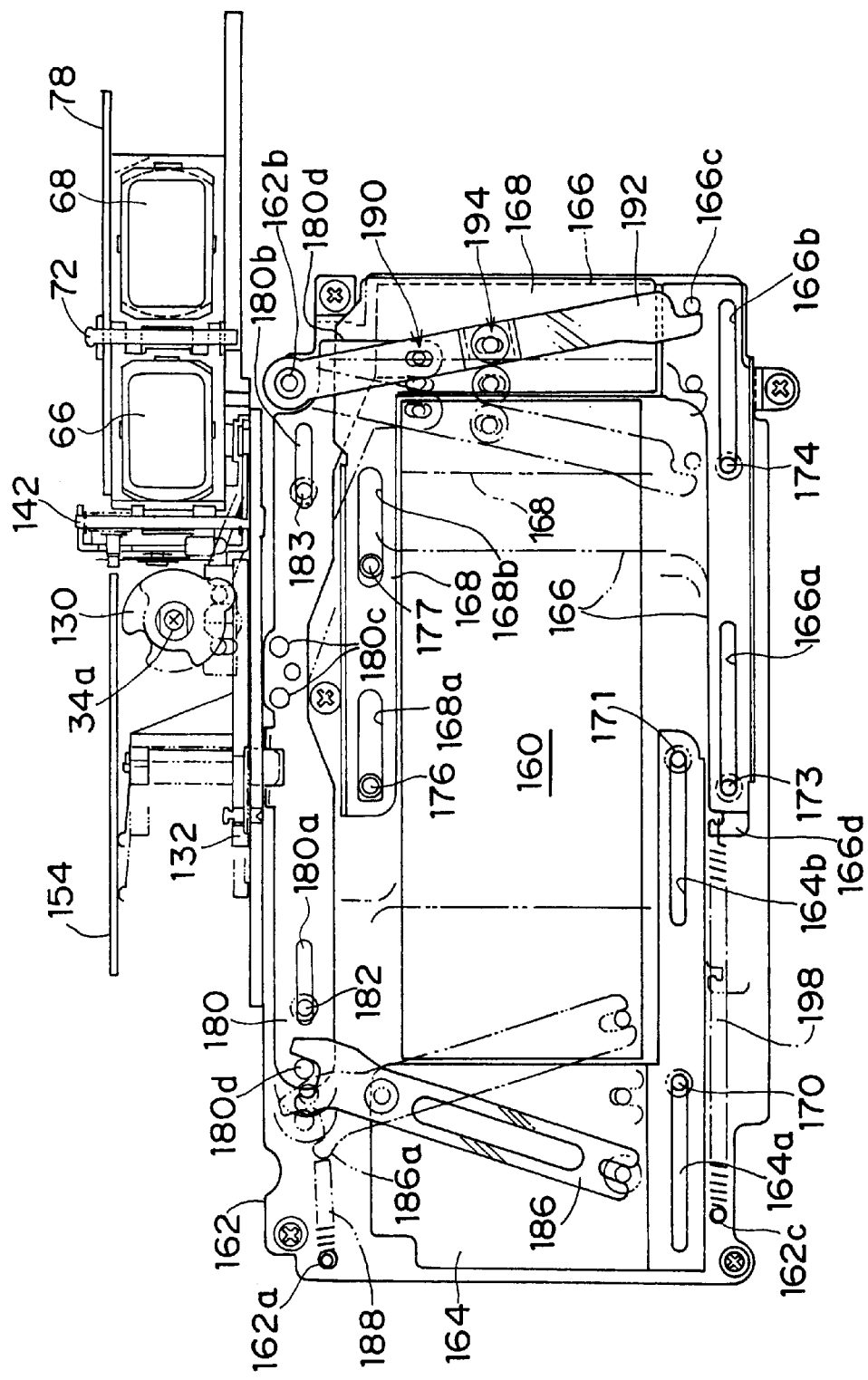
FIG. 9 is a view showing the structure of an aperture changing mechanism.

FIG. 9 shows the structure of the aperture switching mechanism. An aperture frame 162, which has an opening 160 for exposure of a frame in the panoramic size, is provided behind the taking lens 2. A patrone chamber (not shown) is provided at the left side of the aperture frame 162, and a spool chamber (not shown) is provided at the right side of the aperture frame 162. The opening 16 is, for example, a rectangle of 24 mm×65 mm.

A focal plane shutter (not shown) is provided between the taking lens 2 and the aperture frame 162 in such a manner as to be adhered to the aperture frame 162. The focal plane shutter is a square shutter whose shutter blind runs vertically on the picture plane, and the surface treatment is performed for the front face of the shutter blind (which faces to the taking lens) so that it can have the same reflectance as the film plane.

A first light shielding frame 164 is provided at the left side of the aperture frame 162, and the first light shielding frame 162 is movable forward and backward with respect to the opening 160. A second light shielding frame 166 and a third light shielding frame 168, which are movable forward and backward with respect to the opening 160, are provided at the right side of the aperture frame 162.

The first light shielding frame 164 has slots 164a, 164b, and it is slidable horizontally in the drawing with guide of the slots 164a, 164b and pins 170, 171 provided at the aperture frame 162.

Likewise, the second light shielding frame 166 is supported in such a way as to be slidable horizontally with guide of the pins 173, 174 and slots 166a, 166b. The third light shielding frame 168 is supported in such a way as to be slidable horizontally with guide of pins 176, 177 and slots 168a, 168b.

A second NP connecting lever 180 is supported at the top of the aperture frame 162 in such a manner as to be slidable horizontally in the drawing with guide of pins 182, 183 and the slots 180a, 180b. The second NP connecting lever 180 connects to the first NP connecting lever 132, which was described with reference to FIG. 8, through the pawl 132b. The second NP connecting lever 180 moves horizontally in engagement with the first NP connecting lever 132.

Click openings 180c are formed in the second NP connecting lever 180, and the slide of the second NP connecting lever 180 results in the insertion of click balls into the click openings 180c to control shaking of the second NP connecting lever 180.

The second NP connecting lever 180 is connected to the first light shielding frame 164 through a first frame lever 186. The first frame lever 186 is rotatably supported on a shaft 187. The top end of the first frame lever 186 is coupled to a pin 180d of the second NP connecting lever 180, and the bottom end of the first frame lever 186 is coupled to the pin 164c of the first light shielding frame 164.

A hook 186a is formed at the top end of the first frame lever 186, and a spring 188 is stretched between the hook 186a and the pin 162a of the aperture frame 162. The spring 188 forces the first frame lever 186 counterclockwise in the drawing, and the first light shielding frame 164 is forced in a direction to move into the opening 160 (to the right in FIG. 9).

An arm 180d is provided at the right end of the second NP connecting lever 180, and the arm 180d extends downward at a right angle. The arm 180d connects to a second frame lever 192 through a connecting pin 190. The second frame lever 192 is rotatably supported on a shaft 162d provided at the upper right corner of the aperture frame 162 and is connected to the third light shielding frame 168 through a connecting pin 194.

The end of the second frame lever 192 (the bottom end in FIG. 9) is coupled to a pin 166c provided at the lower right corner of the second light shielding frame 166.

A hook 166d is formed at the end of a guide part provided with a slot 166a of the second light shielding frame 166, and a spring 198 is stretched between the hook 166d and the pin 162c provided at the lower left corner of the aperture frame 162. The spring 198 forces the second light shielding frame 166 to the left in the drawing, and the second light shielding frame 166 and the third light shielding frame 168 are forced in a direction to move into the opening 160 (to the left in FIG. 9).

When the picture plane changeover control 34 is set to the panoramic size, the first NP connecting lever 132 moves to the right in the drawing as indicated by a solid line in FIG. 9. In engagement with the first NP connecting lever 132, the second NP connecting lever 180 moves to the right against the force of the springs 188, 198 and stops at a position where the click ball is put in the click opening for the panoramic size.

Consequently, the first light shielding frame 164 moves away from the opening 160, and the second and third light shielding frames 166, 168 move away from the opening 160 in the state of overlapping each other. This defines an exposure opening with a panoramic angle of view which is specified with the opening 160 of the aperture frame 162.

Since the second and third light shielding frames 166, 168 move from the opening 160 in the state of overlapping, it is possible to reduce a space into which the shielding frames move, compared with the case where the light shielding member is composed of one shielding plate. Thus, the width of the camera can be reduced.

If the picture plane changeover control 34 is set at the normal side, the first NP connecting lever 132 moves to the left in the drawing as indicated by long and two short alternate lines in FIG. 9. At this time, a click ball is removed from the click hole 180c, and the spring forces of the springs 188, 189 are released. Due to the spring forces, the first light shielding frame 164 slides to the right in the drawing and reaches a position indicated by the two long and short alternate lines in the area at the left side of the opening 160. The second and third light shielding frames 166, 168 also slide to the left in the drawing and reach a position (normal position) indicated by long and two short alternate lines in the area at the right side of the opening 160.

In this case, the second light shielding frame 166 slides to the left much more than the third light shielding frame 168, and the second and third light shielding frames 166, 168 shield the right side of the opening 160 in cooperation with each other. The first, second and third light shielding plates 164, 166, 168 projects into the opening 160. The right end face of the first light shielding frame 164, the left end face of the second light shielding frame 166, and the upper and lower sides of the opening 160 specify the exposure opening for exposure of a frame in the normal size. The frame in the normal size is, for example, a rectangle of 24 mm×36 mm.

There are provided two click holes 180c for the panoramic size and the normal size. Since the spring force is larger in the case of the panoramic size, the change of diameters of the hole results in the adjustment of the operating power.

A description will be given of the electric structure of the camera.

Figure 10:
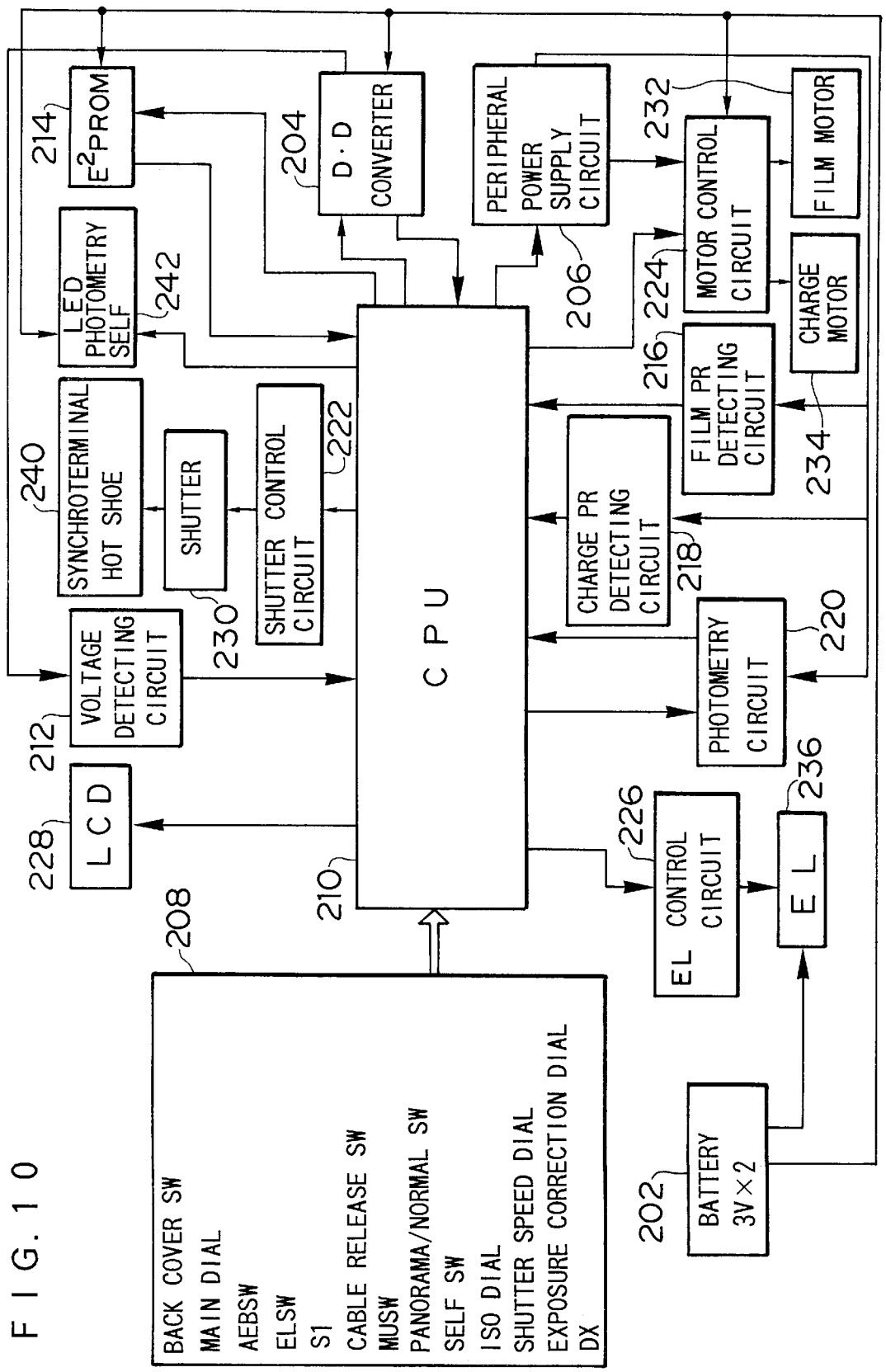
FIG. 10 is a block diagram showing the electric structure of the camera.

FIG. 10 is a block diagram showing the electric structure of the camera. The camera 1 is comprised mainly of a power supply system which is composed of a battery 202 for a power supply, a DC/DC converter 204 and a peripheral power supply circuit 206, a variety of operation input parts 208 such as a main dial, and a central process unit (CPU) 210. The CPU 210 controls the workings of the camera 1 as a whole.

The CPU 210 controls the DC/DC converter 204, which converts a power supply voltage of the battery 202 into a preset voltage. The output of the DC/DC converter 204 is transmitted to a voltage detecting circuit 212, an E$^2$PROM 214, the peripheral power supply circuit 206, or the like. The voltage value detecting circuit 212 detects the voltage value supplied from the DC/DC converter 204 and posts the detection results to the CPU 210.

The CPU 210 controls the peripheral power supply circuit 206, which supplies the power to a film PR (photo-reflector) detecting circuit 216, a charge PR detecting circuit 218, and a photometry circuit 220.

The operation switches of the operation input parts 208 are a back cover switch which indicates the opened and closed state of a back cover 44, a main dial 24, an AEBSW 40, an ELSW 41, a S1 indicating the half-pressed state of a release button, a cable release switch, a halfway rewind switch 42, a panorama/normal switch (PNSW), a self switch, an ISO dial 14, a shutter speed setting dial 26, an exposure correction dial, a DX detecting switch, etc.

The CPU 210 controls a shutter control circuit 222, a motor control circuit 224, an EL control circuit 226, and a liquid crystal panel such as an liquid crystal display (LCD) 228 in accordance with signals which are input from the operation input part. The CPU 210 also controls a sequence of workings required for photography in accordance with a sequence program which is written in the E$^2$PROM 214. The CPU 210 controls the workings with reference to signals input from the detection system such as the film PR detecting circuit 216, the charge PR detecting circuit 218 and the photometry circuit 220.

The film PR detecting circuit 216 includes a photosensor which detects perforations on the film, and the photosensor is arranged at an appropriate position on a film transport passage between the patrone chamber and the spool chamber. The photosensor outputs signals in response to the passage of the perforations.

The film PR detecting circuit 216 counts changes in signals output from the photosensor to thereby detect the passage of the perforations and the film movement amount at the time of film feeding or rewinding. The passage of one perforation is equivalent to two changes in output signals; from high to low and vise versa.

The charge PR detecting circuit 218 optically detects a mechanical position of the shutter, and checks whether the shutter is set at a preset charging position.

The CPU 210 controls the photometry circuit 220, and the photometry circuit 220 meters the light, which moves in the camera through the taking lens 2, in accordance with a light receiving signal from an electric eye photocell arranged in front of the shutter blind. The photometry circuit 220 posts the photometry results to the CPU 210.

The shutter control circuit 222 controls the opening and closing of the shutter 230 in accordance with the setting of the shutter speed setting dial 26 and the photometry data from the photometry circuit 220. The shutter control circuit 222 adjusts a light emission timing of a synchroterminal or a hot shoe indicated by reference numeral 240.

The motor control circuit 224 receives the power from the battery 202, and controls a film transport motor (a film motor) 232 and a charge motor 234, which drives a shutter blind of a focal plane shutter, in accordance with a control signal from the CPU 210.

The EL control circuit 226 turns on and off a backlight (EL) 236 of the liquid crystal display 36 in accordance with the control signal from the CPU 210. The EL control circuit 226 and the backlight 236 receives the power directly from the battery 202.

The CPU 210 also controls the display of the liquid crystal display 36, and controls the turn-on/off of a light emitting diode (LED) 242 in a self lamp or a finder. The battery 202 supplies the power to the light emitting diode.

A description will now be given of the operation of the camera which is constructed in the above-mentioned manner.

When the lens barrel for the f=90 mm taking lens 2 is mounted in the mount of the camera 1, the pawl 99 of the lens barrel 6 presses down the projecting piece 91d of the fifth connecting member 91 as described with reference to FIG. 6, and the fifth connecting member 91 moves downward as indicated by long and two short alternate lines in FIG. 6. The sixth connecting member 94 swings counterclockwise about a shaft 100 in engagement with the descent of the fifth connecting member 91 to rotate the second connecting member 84 in FIG. 5 clockwise in FIG. 5.

The end of the arm of the second connecting member 84 connects to the first connecting member 80 through the connecting pin 80b. The clockwise rotation of the second connecting member 84 results in the clockwise rotation of the first connecting member 80. Accordingly, the arm 90a of the first connecting member 80 moves to a position (a 90 mm position) indicated by long and two short alternate lines, and the 45 mm eyepiece lens group 64 and the 90 mm eyepiece lens group 66 slide to the right along the guide grooves 78a, 78b.

At this time, the boss 68a of the lens frame 68 which holds the 45 mm eyepiece group 64 is regulated by the L-shaped guide groove 78a, and the lens frames 68, 70 are folded at a joint thereof in the front portion of the camera to move away from the finder optical axis. For this reason, the camera is narrower than a camera in which the lens frame 68 moves parallel to a direction in which two eyepiece groups are arranged.

On the other hand, the 90 mm eyepiece group 66 moves to the left along the guide groove 78b to move to the finder optical axis. Thus, the 45 mm eyepiece group 66 is switched to the 90 mm eyepiece.

Figure 11A:
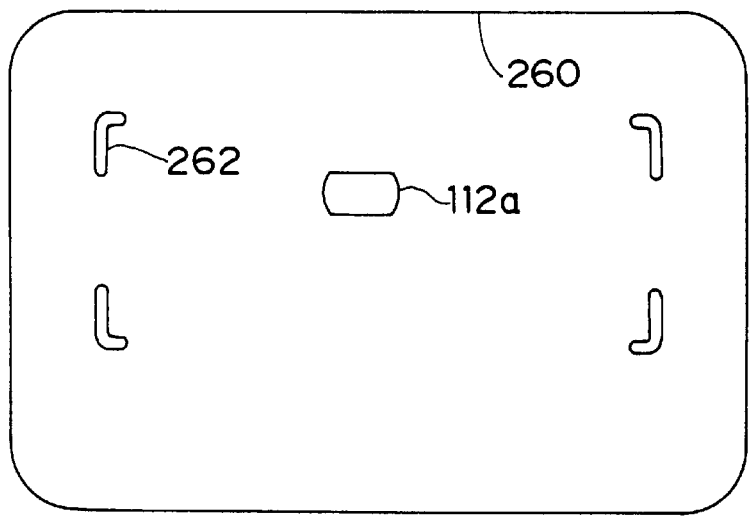
FIG. 11(a) shows the state of infinity in the case of the panoramic size.
Figure 11B:
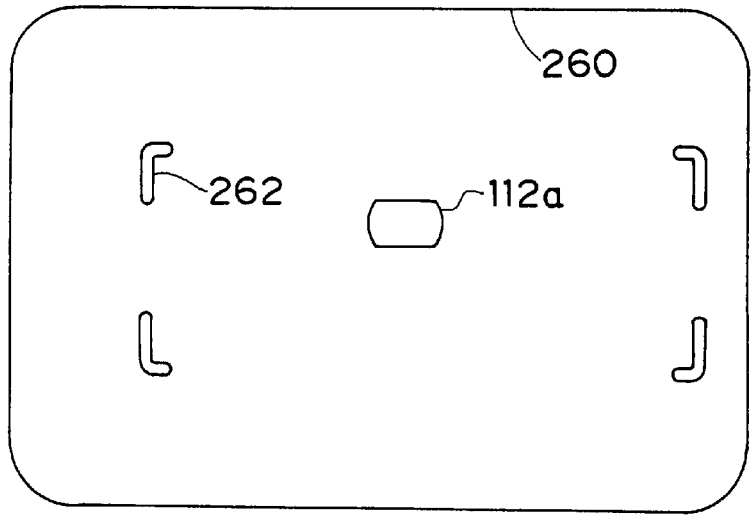
FIG. 11(b) shows the state of point-blank range in the case of the panoramic size.

Mounting the f=90 mm lens moves the fourth connecting member 88 downward in FIG. 5, which causes the lever part 88d of the fourth connecting member 88 to drive the 45 mm/90 mm changeover frame 110 in FIG. 7. The movement of the 45 mm/90 mm changeover frame 110 results in appearance of a frame 260 for the 90 mm lens on the finder as shown in FIGS. 11(*a*) and 11(*b*). A frame 262 of a size conforming to the selection of the picture plane changeover control 34 is displayed within the frame 260.

FIG. 11 shows an example of a visual field observed through the eyepiece when the 90 mm lens is mounted. FIG. 11(*a*) shows the state of infinity in the panoramic size, and FIG. 11(*b*) shows the state of point-bland range (1 m) in the panoramic size.

If the panoramic size is selected by manipulation of the picture plane changeover control 34, the first NP connecting lever 132 moves to the left as indicated by the solid line in FIG. 8 as described with reference to FIG. 8, and the pin 148 of the lift member 144 moves onto a flat part 132*d* of the first NP connecting lever 132.

Accordingly, the NP changeover frame 108 in FIG. 7 moves up diagonally in FIG. 7 with support of the pin 128 fixed to the lift member 144, and the frame 262 for the panoramic size is displayed on the finder as shown in FIGS. 11(*a*) and 11(*b*).

When the distance ring 20 of the lens barrel 6 is rotated, the moving frame 104 is moved diagonally by the lever 120 as described with reference to FIG. 7, so that the parallax correction can be performed automatically in accordance with the distance as shown in FIGS. 11(*a*) and 11(*b*).

On the other hand, if the normal size is selected by manipulation of the picture plane changeover control 34, the first NP connecting lever 132 moves to the right as indicated by long and two short alternate lines in FIG. 8 as described with reference to FIG. 8. The pin 148 of the lift member 144 descends along the oblique plane 132*c* of the first NP connecting lever 132.

Accordingly, the NP changeover frame 108 moves downward diagonally to the right in FIG. 7 with the pin 128 which is fixed to the lift member 144. A frame 264 for the normal size is displayed on the finder as shown in FIGS. 12(*a*) and 12(*b*).

Figure 12A:
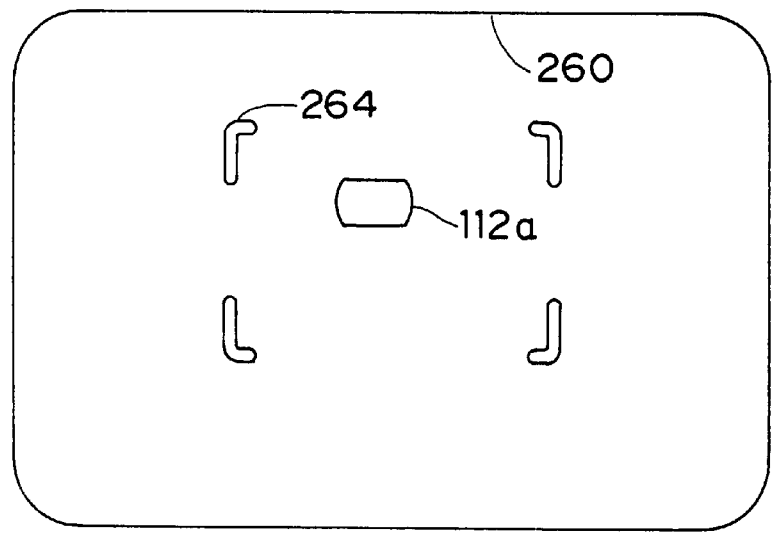
FIG. 12(a) shows the state of infinity in the case of the normal size.
Figure 12B:
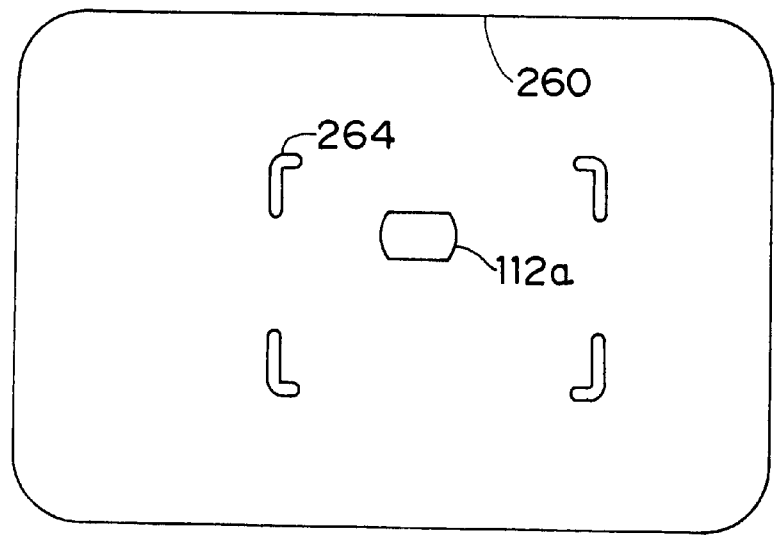
FIG. 12(b) shows the state of point-blank range in the case of the normal size.

FIG. 12(*a*) shows the state of infinity in the case of the normal size, and FIG. 12(*b*) shows the state of point-blank range (1 m) in the normal size. FIGS. 12(*a*) and 12(*b*) are similar to FIGS. 11(*a*) and 11(*b*) in that the parallax correction is performed automatically in engagement with the rotation of the distance ring 20 of the lens barrel 6.

A description will be given of the state wherein the f=45 mm taking lens 2 is mounted in the mount of the camera 1.

Since the pawl 99, which is coupled to the fifth connecting member in FIG. 6, is not formed in the lens barrel for the f=45 mm taking lens 2, the fifth connecting member 91 moves up as indicated by the solid line in FIG. 6 when the f=45 mm lenw is mounted in the mount of the camera 1.

The sixth connecting member 94 swings clockwise about the shaft 100 in engagement with the descent of the fifth connecting member 91 to thereby rotate the second connecting member 84 counterclockwise in FIG. 5.

With the counterclockwise rotation of the second connecting member 84, the first connecting member 80 rotates counterclockwise, and the arm 80*a* of the first connecting member 80 moves to a position (the 45 mm position) indicated by the solid line in FIG. 6. With this movement, the 45 mm eyepiece group 64 and the 90 mm eyepiece group 66 slide to the left along the guide grooves 78*a*, 78*b*. The 45 mm eyepiece group 64 moves into the finder optical axis, whereas the 90 mm eyepiece group 66 moves parallel to the left along the guide groove 78*b* to move away from the finder optical axis. At this time, the 90 mm eyepiece group 66 moves back to the space behind the target lens group 58. The 90 mm eyepiece is switched to the 45 mm eyepiece.

It is possible to reduce the movable area of the lens since the 45 mm eyepiece group 64 and the 90 mm eyepiece group 66 are connected in parallel and the sliding paths thereof are partially overlapped.

Figure 13A:
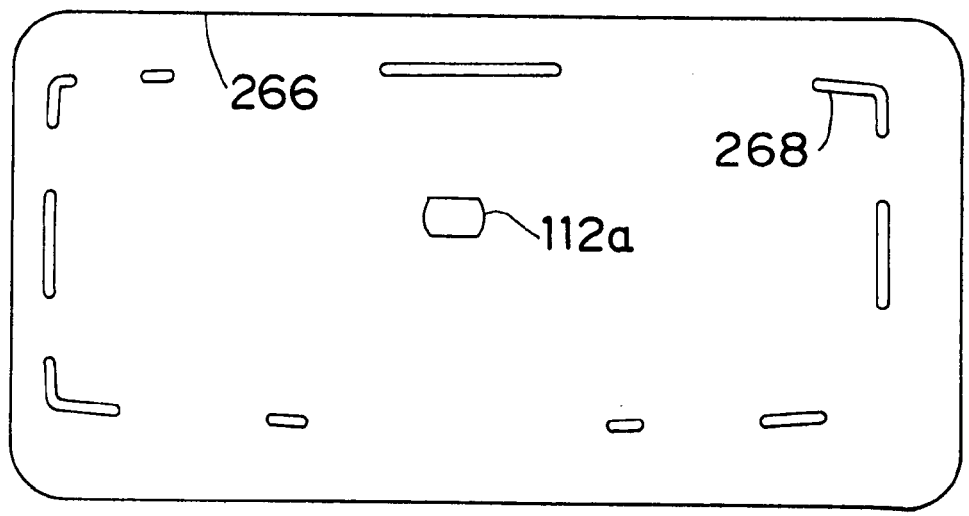
FIG. 13(a) shows the state of infinity in the case of the panoramic size.
Figure 13B:
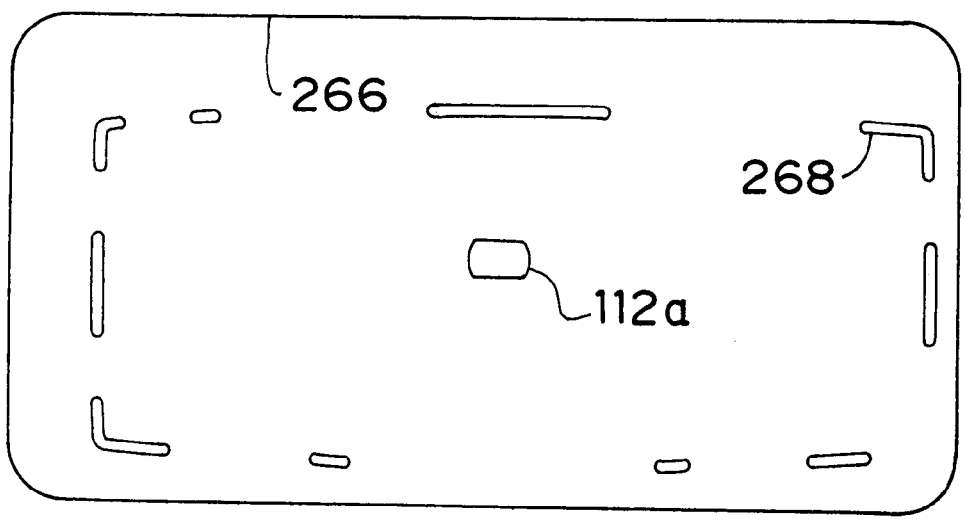
FIG. 13(b) shows the state of point-blank range in the case of the normal size.

Mounting the f=45 mm lens moves the fourth connecting member 88 upward in FIG. 5, which causes the lever part 88*d* of the fourth connecting member 88 to drive the 45 mm/90 mm changeover frame 110, which was described with reference to FIG. 7. The movement of the 45 mm/90 mm changeover frame 110 results in appearance of a frame 266 for the 45 mm lens on the finder as shown in FIGS. 13(*a*) and 13(*b*). A frame 268 of a size selected with the picture size changeover control 34 is displayed within the frame 266.

Figure 14:
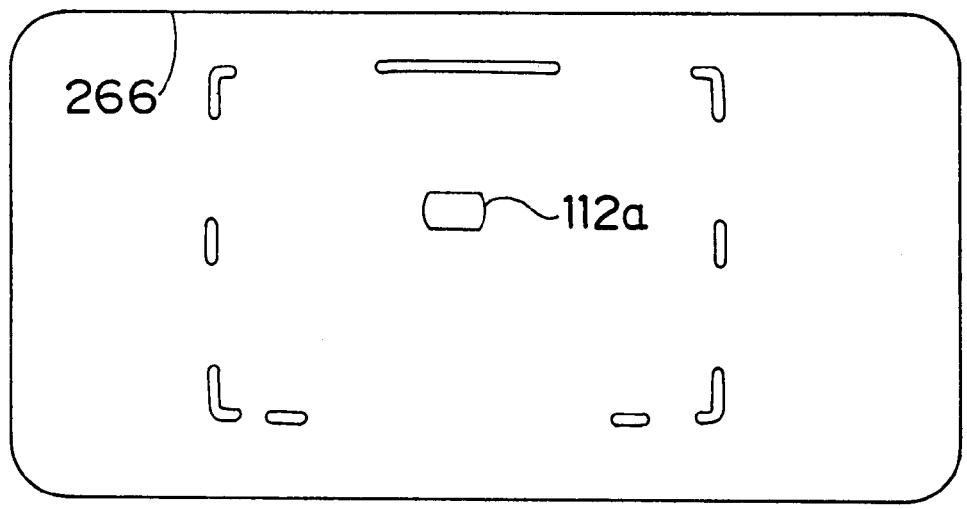
FIG. 14 shows an example of a visual field observed from the eyepiece part when a 45 mm lens is mounted.
Figure 14:
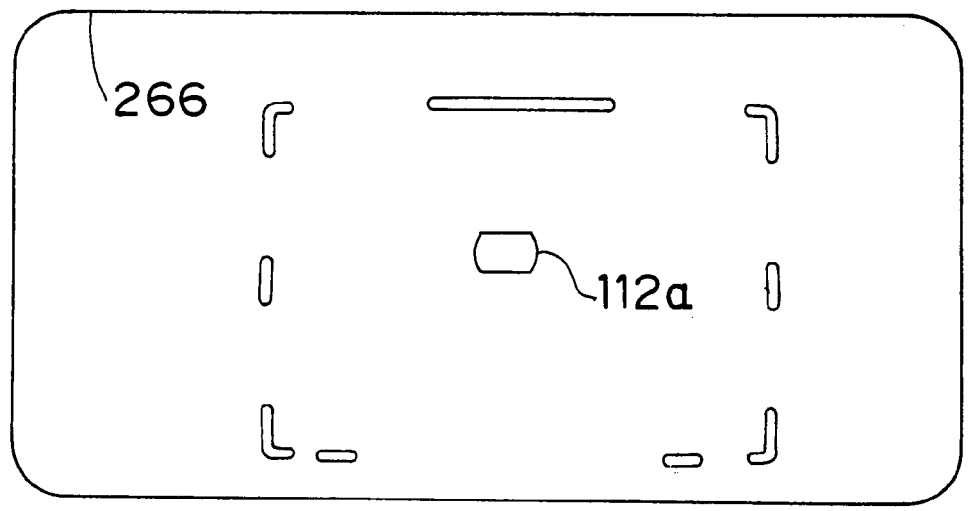

FIGS. 13 and 14 show visual fields observed through the eyepiece when the 45 mm is mounted. FIG. 13(*a*) shows the infinity of the panoramic size, FIG. 13(*b*) shows the point-bland range (0.75 m) of the panoramic size, FIG. 14(*a*) shows the infinity of the normal size, and FIG. 14(*b*) shows the point-blank range (0.75 m) of the normal size.

FIGS. 13 and 14 are similar to FIGS. 11 and 12 in that the displayed frames are switched in accordance with the picture size which is set by manipulation of the picture plane changeover control 34 and that the parallax correction is performed automatically in connection with the manipulation of the distance ring 20 of the lens barrel 6.

A description will be given of a procedure for controlling the camera.

Figure 15:
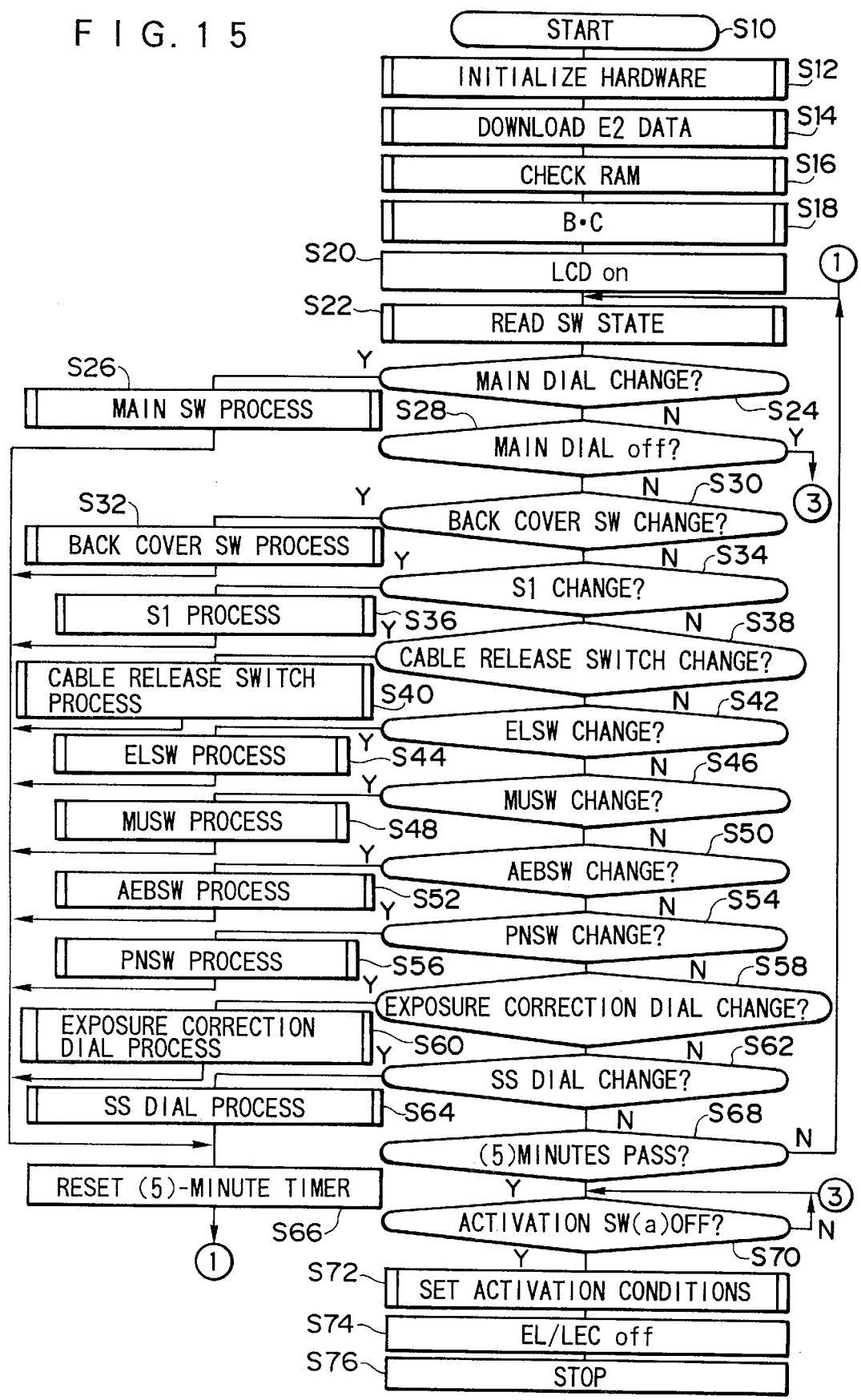
FIG. 15 is a flow chart showing the flow in controlling the workings of the camera.

FIG. 15 is a flow chart showing the flow in the control of camera workings. When the power switch is turned on, the camera starts working (step S10), the hardware is initialized (step S12) and the initial data is read from the E$^2$PROM 214 (S14). Then, the capacity of RAM is confirmed (step S16), and the battery is checked (step S18).

If the residual energy is under a preset value as a result of the battery checking (battery NG), a process such as alerting and stopping the camera is started. If the residual energy is a preset value or more (battery OK), the liquid crystal display 36 is lighted (step S20) and a five-minute timer is started.

Then, the state of the switches of the camera is read (step S22). Specifically, whether there is a change in the main dial 24 or not is checked (step S24). If the mode setting is changed by manipulation of the main dial 24, the mode setting is executed in accordance with the setting (step S26). Then, the five-minute timer is reset after the completion of the mode setting (step S66). After the five-minute timer is reset at the step S66, the process returns to the step S22.

On the other hand, if there is no change in the mode setting of the main dial 24, whether the main dial is turned off or not is checked (step S28). If the main dial 24 is turned off, the process goes to the step S70. The process at the step S70 and subsequent steps will be described later.

If the main dial 24 is turned on at the step S28, whether there is any change in the back cover switch or not is checked (step S30). The back cover switch detects whether the film is loaded or not. If the film patrone is loaded in the patrone chamber, the back cover switch is turned on. If the film patrone is not loaded, the back cover switch is turned off.

If there is a change in the back cover switch, the back cover switch process is performed in accordance with the state of the back cover switch (S32). Specifically, if the back cover switch is off, the back cover detection flag is set at 0 to prohibit the camera from working and the liquid crystal display shows an indication that the film is unloaded.

On the other hand, if the back cover switch is ON, the back cover detection flag is set at 1 to allow the camera to work. On completion of the back cover switch process at the step S32, the process goes on to the step S66.

If there is no change in the back cover switch at the step S30, it is determined whether there is any change or not in the S1 which indicates the half-pressed state of the shutter (step 34). When the release button 22 is pressed by a preset amount, the S1 is switched on so that the S1 process can be performed (step S36). In the S1 process, a sequence of photographing workings including the photometry, the opening and closing of the shutter, and the one-frame feeding is performed. On completion of the S1 process, the process goes on to the step S66.

If there is no change in S1 at the step S34, whether there is any change in the cable release switch or not is determined (step S38). If the cable release switch is switched on, the cable release switch process is performed (step S40) to perform a sequence of photographing workings as is the case with the Si process (step S36). On completion of a predetermined working, the process goes to the step S66.

If there is no change in the cable release switch at the step S38, whether there is any change or not in the ELSW 41 is checked (step S42). If the ELSW 41 is pressed, the ELSW process is performed (step S44), and the backlight is turned on and off. Specifically, the backlight is turned on in response to the ON operation of the ELSW 41, and the backlight is turned off when a predetermined time passes after the backlight is turned on. The backlight may be turned off in response to the OFF operation of the ELSW 41. On completion of the ELSW process, the process goes to the step S66.

If there is no change in the ELSW at the step S42, whether there is any change or not in the MUSW 42 is checked (step S46). If the MUSW 42 is pressed, the MUSW process is performed (step S48) in which the film is rewound pressedly. On completion of the MUSW process, the a process goes to the step S66.

If there is no change in the MUSW at the step S46, whether there is any change or not in the AEBSW 40 is checked (step S50). If the AEBSW 40 is pressed, the AEBSW process is performed (step S52) in which the auto-bracket mode is set. On completion of the AEBSW, the process goes to the step S66.

If there is no change in the AEBSW at the step S50, whether there is any change or not in the PNSW is checked (step S54). If the PNSW is pressed, the PNSW process is performed (step S56). In the PNSW process, a variety of processes are performed according to the selected picture size. The PNSW process will be described later in detail (refer to FIG. 17).

If there is no change in the PNSW at the step S54, whether there is any change or not in the exposure correction dial is checked (step S58). If the exposure correction dial is rotated, the exposure correction dial process is performed (step S60) in which the amount of the exposure correction shift is set. On completion of the exposure correction dial process, the process goes to the step S66.

If there is no change in the exposure correction dial at the step S58, whether there is any change or not in the shutter speed setting dial (SS dial) 26 is checked (step S62). If the SS dial is manipulated, the SS dial process is performed (step S64) in which the selecting shutter speed is set. On completion of the SS dial process, the process goes to the step S66 to reset the five-minute timer. Then, the process returns to the step S22.

If there is no change in the SS dial at the step S62, the five-minute timer is checked to see if five minutes have passed (step S68). If five minutes have not passed yet, the process returns to the step S22. On the other hand, if five minutes have passed at the step S68, or if the main dial is determined as being OFF at the step S28, the OFF state of an activation switch a is confirmed (step S70). Then, the conditions are set for reactivation (step S72).

The activation switch a is the S1, the cable release switch, the MUSW and the ELSW. All of these switches are determined as being OFF at the step S70, and then the process goes to the step S72.

The following three conditions are set at the step S72 for activation from the state wherein the main dial 24 is OFF: the main dial 24 is ON, the back cover switch is ON, and the MUSW 42 is OFF. The following condition plus the above-mentioned three conditions must be satisfied for activation from the standby state: one of the S1, the cable release switch, the MUSW 42 and the ELSW 41 is ON (the activation switch a is ON).

After the activation conditions are set at the step S72, the EL and the LCD are turned off (step S74) to stop the control operation (step S76).

FIG. 16 shows the flow of the activation process from the stationary state at the step S76 in FIG. 15.

The state of all the switches is read for reactivation from the stationary state (step S80) to determined whether the activation conditions set at the step S72 in FIG. 15 are satisfied or not (step S82).

If the state is brought into the stationary state in response to the OFF operation of the main dial 24 at the step S28 in FIG. 15, whether the conditions for activation from the OFF state of the main dial 24 are satisfied or not is determined. On the other hand, if the state is brought into the stationary state on passage of five minutes in the state wherein the main dial is ON, whether the conditions for activation from the standby state are satisfied or not is determined.

If the corresponding activation conditions are satisfied at the step S82, the LCD is turned on (step S84), and the five-minute timer is started. Then, the process returns to the step S22 in FIG. 15. On the other hand, if the corresponding activation conditions are not satisfied at the step S82, the process returns to the step S70 in FIG. 15 to maintain the stationary state (step S76).

A description will be given of the subroutine of the PNSW process (step S56) in FIG. 15.

Figure 17:
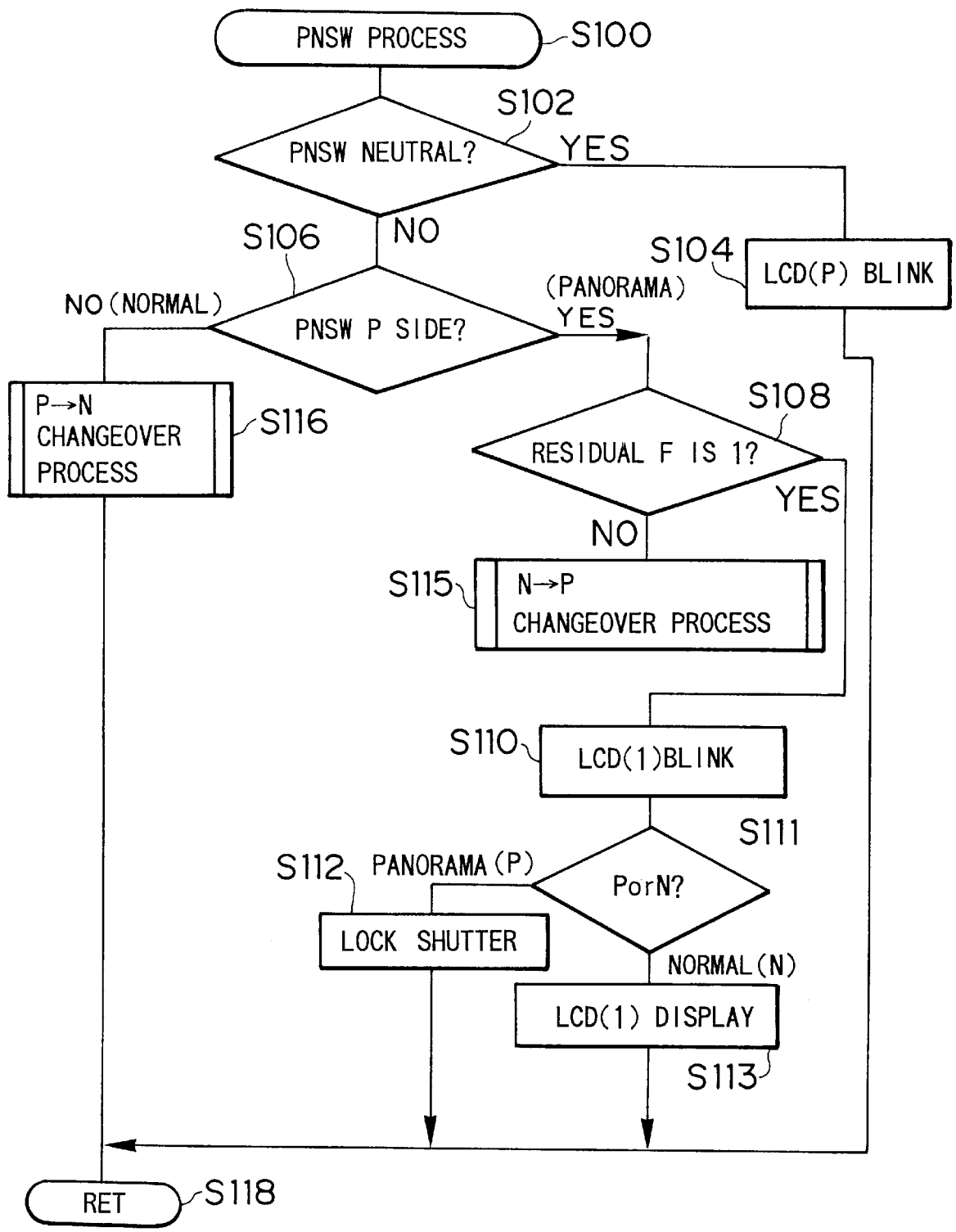
FIG. 17 is a flow chart showing the flow in a PNSW process in FIG. 15.

FIG. 17 is a flow chart showing the flow of the PNSW process. On start of the PNSW process (step S100), it is determined whether the PNSW switch equivalent to the picture plane changeover control 34 is neutral, in other words, incompletely set between the panorama setting position and the normal setting position (step S102). If the PNSW is neutral, a blinking character "P" is displayed on the liquid crystal display 36 to warn to the effect that the setting of the picture size has not been fixed (step S104). Then, the process returns to the main routine in FIG. 15 (step S118).

If the PNSW is not neutral at the step S102, the picture size, which is selected and set by the PNSW, is checked (step S106). If the panoramic size is selected (the normal size is switched to the panoramic size), it is determined whether the number of residual frames in the normal size before switching is one or not (step S108). If the number of residual frames is one, it is decided that the photography is impossible in the panoramic size, and then a blinking number "1" is displayed on the film counter 28 (step S110) so as to warn to the effect that the photography is impossible in the panoramic size and prompt the user to perform the photography in the normal size.

The state of the PNSW is checked again (step Sill). If the setting of the panoramic size is maintained, the shutter is locked (step S112) to prohibit the shutter from being released. For example, even if the release button 22 is pressed, the CPU 210 does not accept a signal from the release button 22 to prevent the shutter from opening and closing.

On the other hand, if the PNSW is changed to the normal size at the step S111, "1" is displayed on the film counter 28 (step S113) to indicate that only one picture can be taken in the normal size. Then, the process returns to the main routine in FIG. 15 (step S118).

If the number of residual frames in the normal size is two or more at the step S108, the photography can be performed in the panoramic size, and thus, the later-described "NAP switch process" is performed (step S115). Then, the process returns to the main routine in FIG. 15 (step S118).

If the PNSW is set at the normal size (the panoramic size is switched to the normal size ) at the step S106, the later-described "PAN switch process" is executed (step S116). Then, the process returns to the main routine in FIG. 15 (step S118).

Figure 18:
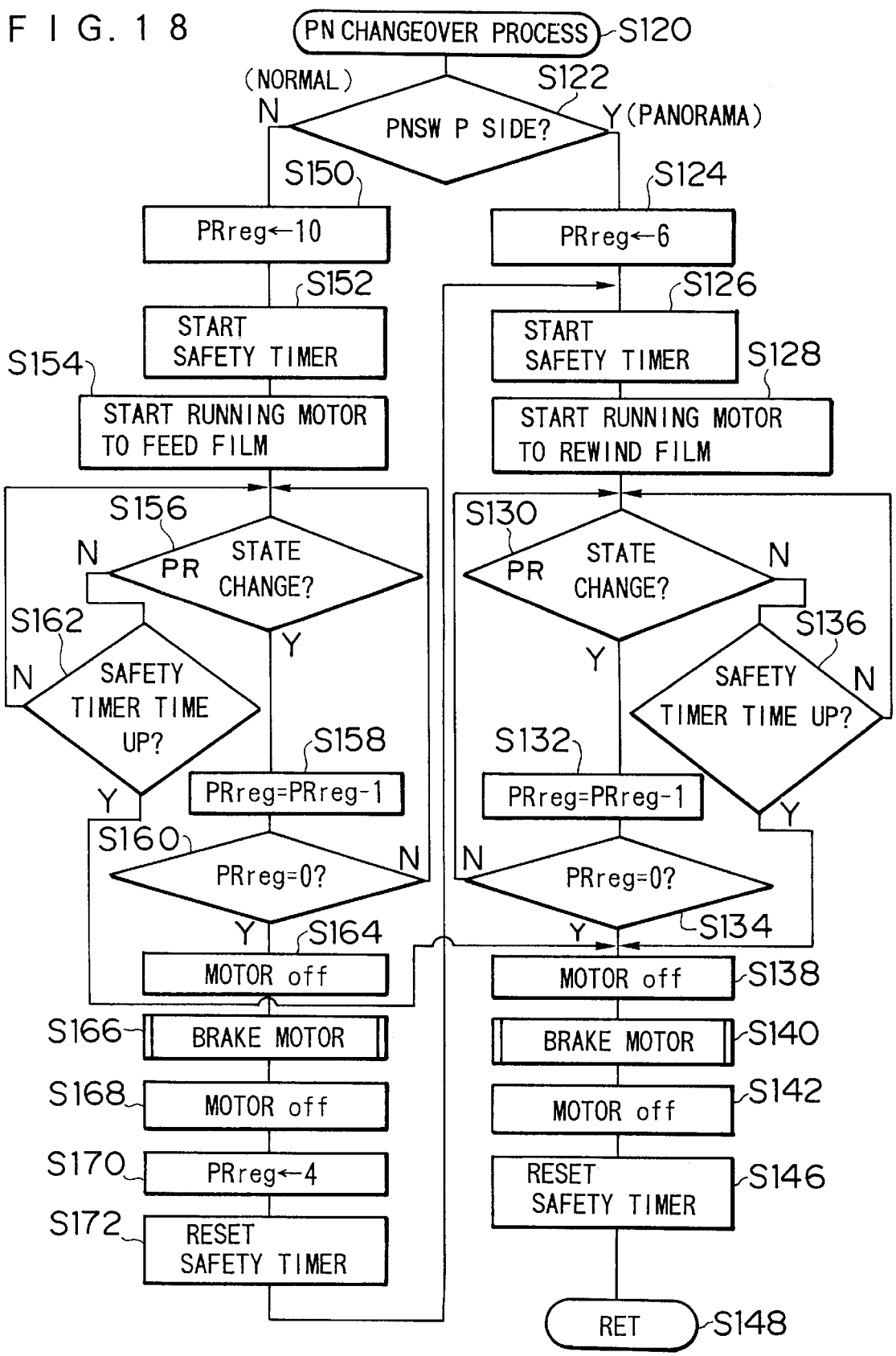
FIG. 18 is a flow chart showing a sub-routine of a process for changing picture size.

FIG. 18 shows the subroutine of the picture size switch process.

On start of the picture size switch process (step S120), whether the PNSW is set at the panoramic size or the normal size is checked first (step S122). If the PNSW is set at the panoramic size (which is equivalent to If the "NIP switch process" at S115 in FIG. 17), "6" equivalent to the shortage feed amount is set in the photoreflector register (PRreg) (step S124). Since two changes in the signal from the film PR detecting circuit 216 are equivalent to the passage of one perforation, "6" is equivalent to three perforations.

Thereafter, a safety timer is started (step S126), and a film motor 232 is run to rewind the film (step S128). The time of the safety timer is set at 90 seconds for example.

While the film is rewound, the CPU 210 of the camera monitors the changes in the signal from the film PR detecting circuit 216 (step S130), and subtracts 1 from the value set in the PRreg every time there is a change in the signal (step S132). The process at the steps S130 and S132 is repeated until the value in PRreg reaches 0 (step S134).

If there is no change at the step S130, whether the time of the safety timer is up or not is checked (step S136). If the time is not up, the process returns to the step S130. If the time is up, the process goes to step S138.

If the time of the safety timer is up at the step S136, or if the film is fed by three perforations to cause the value in the PRreg to reach "0", the film motor 232 is switched off to stop transporting the film (step S138). Then, both poles of the motor 232 are excited to brake the motor 232 (step S140), and the current is shut out from the motor 232 (step S142). Then, the safety timer is reset (step S144), and the process returns to the main routine in FIG. 15 (step S146).

A description will now be given of the state wherein the normal size is set at the step S122. If the PNSW is set at the normal size, which is equivalent to the "P→N switch process" at the step S116 in FIG. 17, the PRreg is set at 10 (step S150). "10" is equivalent to five perforations.

Then, the safety timer is started (step S152), and the film motor 232 is run to feed the film (step S154).

While the film is fed again, the CPU 210 of the camera monitors the changes in the signal from the film PR detecting circuit 216 (step S156), and subtracts 1 from the value set in the PRreg every time there is a change in the signal (step S158). The process at the steps S156 and S158 is repeated until the value in PRreg reaches 0 (step S160).

If there is no change at the step S156, whether the time of the safety timer is up or not is checked (step S162). If the time is not up, the process returns to the step S156. If the time is up, the process goes to step S164.

If the time of the safety timer is up at the step S164, or if the film is rewound on a take-up reel by five perforations to cause the value in the PRreg to reach "0", the film motor 232 is switched off to stop transporting the film (step S164). Then, both poles of the motor 232 are excited to brake the motor 232 (step S166), and the current is shut out from the motor 232 (step S168).

Then, the PRreg is set at "4" (step S170), and the safety timer is reset (step S172). The process goes to the step S126. The process from the step S126 through the step S148 is described previously, and the film is rewound by two perforations.

In this embodiment, if the panoramic size is switched to the normal size, the film is transported backward by five perforations and is transported forward by two perforations. The backward transport amount, however, is not limited to five perforations on condition that it is three or more perforations equivalent to the excessive feed amount.

As stated above, when the panoramic size is switched to the normal size, the film must always be positioned in such a way that the film is transported in one direction (film rewinding direction). This avoids the effects of a transport error resulting from the backlash of a film driving force transmission mechanism and a detection error in the perforation detecting means.

A description will be given of the one-frame feed process after the photography.

Figure 19:
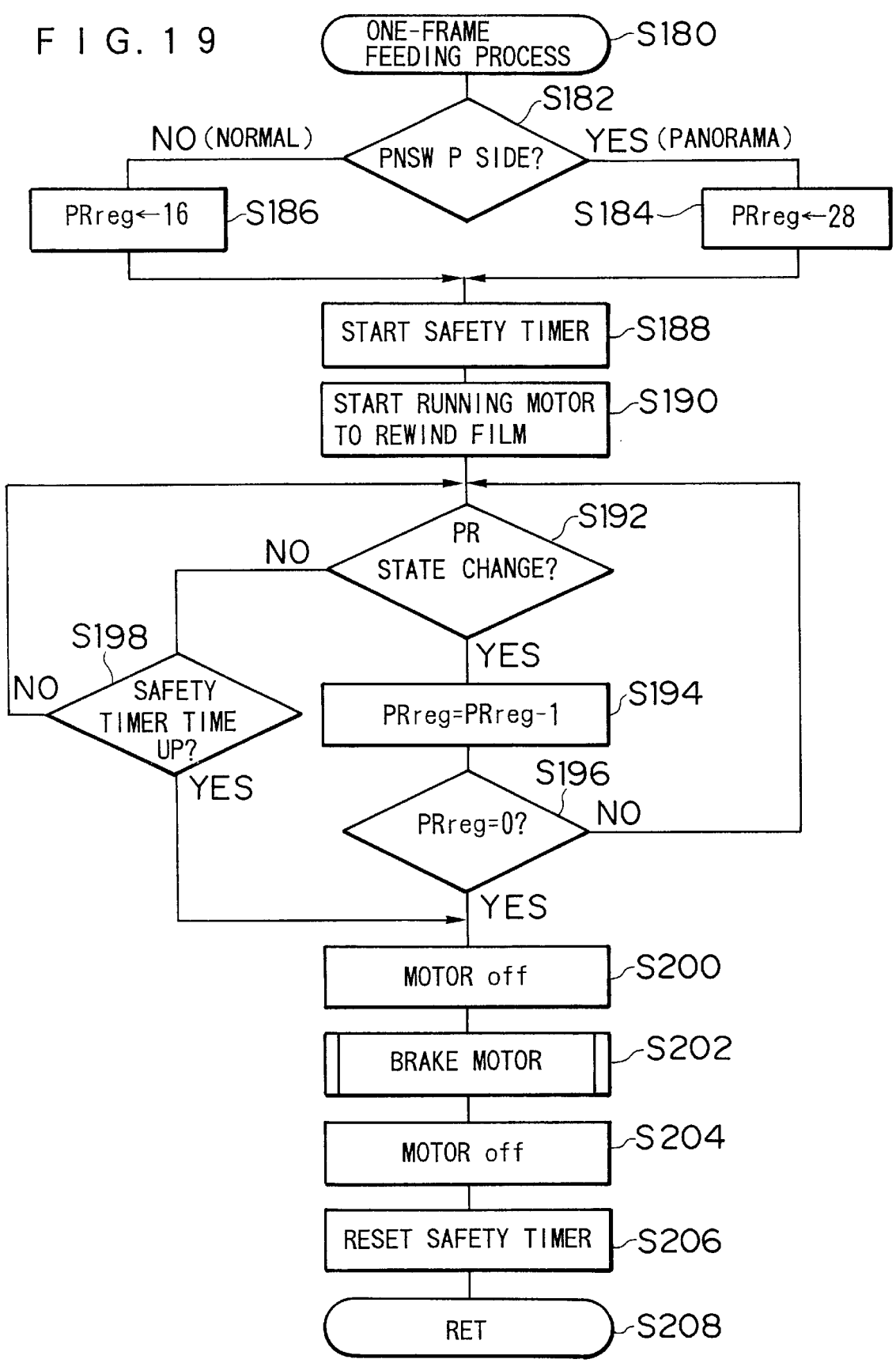
FIG. 19 is a flow chart showing a sub-routine of a one-frame feeding.

FIG. 19 shows the subroutine of the one-frame feeding (one-frame rewinding). On start of the one-frame feed process after the exposure (step S180), whether the PNSW is set at the panoramic size or the normal size is checked (step S182). If the PNSW is set at the panoramic size, "28" is set in the PRreg (step S184). "28" is equivalent to fourteen perforations.

On the other hand, if the PNSW is set at the normal size at the step S182, "16" is set in the PRreg. "16" is equivalent to eight perforations.

Then, the safety timer is started (step S188), and the film motor 232 is run to rewind the film (step S190).

While the film is fed again, the CPU 210 of the camera monitors the changes in the signal from the film PR detecting circuit 216 (step S192), and subtracts 1 from the value set in the PRreg every time there is a change in the signal (step S194). The process at the steps S192 and S194 is repeated until the value in PRreg reaches 0 (step S196).

If there is no change at the step S192, whether the time of the safety timer is up or not is checked (step S198). If the time is not up, the process returns to the step S192. If the time is up, the process goes to step S200.

If the time of the safety timer is up at the step S198, or if the film is transported by three perforations to cause the value in the PRreg to reach "0", the film motor 232 is switched off to stop transporting the film (step S200). Then, both poles of the motor 232 are excited to brake the motor 232 (step S202), and the current is shut out from the motor 232 (step S204). Then, the safety timer is reset (step S206), and the process returns to the main routine in FIG. 15 (step S208).

A description will be given of the process when the number of residual frames is 0 after the panoramic photography.

As shown in FIG. 20, if the film feed process is executed after the exposure in the panoramic size (step S220), whether the number of residual frames in the normal size is 1 or less or not (S222) is checked. If the number of residual frames in the normal size is 2 or more, another panoramic photography can be performed, and thus, the one-frame rewinding process is performed in the panoramic size (step S224) to set the next frame. Then, the process returns to the main routine in FIG. 15.

If the number of residual frames in the normal size is 1 or less at the step S222, it is decided that the photography is impossible in the panoramic size. A blinking number "1" is displayed on the film counter 28 (step S226) to warn to the effect that the photography is impossible in the panoramic size and prompt the user to perform the photometry in the normal size.

Then, the state of the PNSW is checked again (step S227). If the setting of the panoramic size is maintained, the shutter is locked (step S228) to prohibit the shutter from being released.

If the PNSW is changed to the normal size at the step S227, whether the number of residual frames in the normal size is 1 or 0 is determined (step S230). If the number of residual frames in the normal size is 0, the film is rewound automatically so that the entire film can be housed in the patrone (step S230) so as to enable the film be taken out from the camera.

On the other hand, if the number of residual frames in the normal size is 1, the photography in the normal size is allowed. Specifically, "1" is displayed on the film counter (step S234), and the one-frame rewinding process is executed automatically in the normal size (step S236). Even if the number of residual frames in the panoramic size is 0, it is possible to perform the photography when the number of residual frames in the normal size is 1. This eliminates the waste of the film.

The process for the last frame on the film is not limited to the one mentioned above. A description will be given of another embodiment of the process for the last frame on the film.

First, a description will be given of the case where the number of residual frames in the normal size is 1. If the picture size changeover control is set at the normal size and the film counter 28 shows "1" as the number of residual frames in the normal size, the residual frames are not enough for the photography in the panoramic size. In this case, if the picture plane changeover control 34 is manipulated to switch the normal size to the panoramic size, the film counter 28 may show a blinking character "P", which indicates that the number of residual frames in the panoramic size is displayed, and a blinking number "0" representing the number of residual frames.

The blinking display is used for alerting to the effect that the photography is impossible in the panoramic size and prompt the user to change the panoramic size to the normal size. The alerting may be displayed in a variety of ways other than the above-mentioned manner. A message or an alarm number is displayed, a warning lamp is lighted, or the like. With the display of the alerting, the shutter is preferably locked to prohibit the photographic workings.

In another embodiment, when the number of residual frames in the normal size is 1, an indication is given to the effect that the picture size cannot be switched to the panoramic size in order to prevent the picture size from being switched. In this case, a warning message or an alarm number may be displayed, a warning lamp may be lighted, or the like.

A description will be given of the case where the residual number of frames in the panoramic size changes from 1 to 0.

If the photography is performed in the panoramic size when the number of residual frames in the panoramic size is 1, "0" is displayed on the film counter 28; however, a frame may remain on the film to such an extent as to permit the photography in the normal size. In this case, the photography in the normal size is allowed, and it is therefore possible to make good use of the film.

Specifically, when a frame remains to such an extent as to permit the photography in the normal size even if the number of residual frames in the panoramic size is 0, a blinking number "1" is displayed on the film counter 28 to inform the user that the photography in the normal size is permitted. On the other hand, if a frame does not remain to such an extent as to permit the photography in the normal size, "0" may be displayed on the film counter 28 to start rewinding the film automatically.

If a frame remains to such an extent as to permit the photography in the normal size, the picture size may be switched automatically to the normal size before the user switches the picture size, and the film is fed in a manner suitable for the photography in the normal size.

For instance, a driving means such as a plunger is provided to drive the aperture switching mechanism, and the driving means is driven in accordance with an electric signal from the picture plane changeover switch to switch the picture size. When the CPU 210 determines that there are some frames remaining to such an extent as to permit the photography in the normal size after the photography in the panoramic size when the number of residual frames is 1, the CPU 210 outputs a signal which controls the driving means so as to switch the picture size automatically.

On the other hand, when the photography in the panoramic size is performed if the number of residual frames in the panoramic size is 1, the automatic film winding (or rewinding in the case of a preliminary winding type) is ended, regardless of whether there is a frame remaining to such an extent as to permit the photography in the normal size. After the photography for the last frame in the panoramic size, a process for housing the entire film in the patrone (the automatic rewinding process) is executed.

The above-described embodiment is directed to the camera of the preliminary winding type which pre-winds the film just after the patrone is loaded and houses the film in the patrone every time the photography is performed for one frame. The present invention may also be applied to a camera which feeds the film from the patrone every time the photography is performed for one frame.

In this embodiment, the photosensor detects the perforations to find the film feed amount, but the present invention should not to be limited to this. The amount of rotations of a rotary sprocket, which is engaged with the perforations, may also be detected.

In this embodiment, the present invention is applied to the normal/panorama switching camera which is capable of switching the picture size between the normal size and the panoramic size which is larger than the normal size in the film feed direction. The present invention may also be applied to the camera which is capable of switching the picture size between a full size and a half size.

As set forth hereinabove, according to the camera capable of switching the picture size, a light shielding member, which increases and decreases an opening area by covering the exposure opening at least partially, is composed of multiple light shielding plates, and at least two light shielding plates partially overlap each other to move from the exposure opening. For this reason, it is possible to reduce the space into which the light shielding plates move, and therefore, the camera can be compact.

The present invention is particularly advantageous because it is applied to the camera which is capable of switching the size of the photographic frame on the film between the normal size and the panoramic size which is larger than the normal size in the film feed direction.

Specifically, the exposure opening for the panoramic size is formed in the aperture, and the light shielding member shields the right and left sections of the exposure opening for the panoramic size, thereby reducing the area into which the light shielding member moves in the film feed direction (along the width of the camera) and reducing the width of the camera.

According to the camera of the present invention which is capable of switching the picture size, if the picture size is switched in the state wherein the film is fed automatically and set at a position for the first size or the second size which is larger than the first size in the film feed direction, the film is positioned in such a way that the film is transported in the same direction (forward) when the first size is switched to the second size and vise versa. This avoids the effects of the transport error resulting from the backlash of the film driving force transmission mechanism and the error in detection of perforations, etc., thereby positioning the film accurately.

According to the camera of the present invention which is capable of switching the picture size, if the picture size is switched to the second size when the number of residual frames in the first size is 1, an alert is given to the effect that the photography in the second size is impossible. For this reason, whether the photography for the last frame on the film is possible or not can easily be determined, and the alerting prompts the user to perform the photography in the first size. Thus, it is possible to make good use of the film.

Moreover, the photography in the second size is prohibited if the picture size is switched to the second size when the number of residual frames is 1 in the first size, and it is therefore possible to prevent a fog from laying over the exposed frames partially (double exposure).

Since the user is previously informed that the picture size cannot be changed to the second size if the number of residual frames is 1 in the first size, it is possible to prevent the size from being changed to the second size when the photography in the second size is impossible. The alerting prompts the user to perform the photography in the first size, and it is therefore possible to make good use of the film.

Furthermore, according to the camera of the present invention which is capable of switching the picture size, if there is a frame remaining to such an extent as to permit the photography in the first size when the number of residual frames in the second size is 0, the photography in the first size is permitted. It is therefore possible to make good use of the film.

Furthermore, according to the camera of the present invention which is capable of switching the picture size, if there is a frame remaining to such an extent as to permit the photography in the first size when the number of residual frames in the second size is 0, the film winding is ended. This simplifies the control of the film feeding, and eliminates the necessity for complicated operations.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A camera capable of switching a picture size of a photographic frame exposed on a film between a first size and a second size which is larger than the first size in a film feed direction, said camera comprising:

setting means for setting the picture size;

transport means for transporting the film forward and backward with drive of a motor;

automatic feed control means for controlling said transport means to transport the film forward by a film feed amount suitable for the picture size set by said setting means and set the film at a position to enable photography in the set picture size; and picture size changeover feed control means for controlling said transport means to transport the film forward to such a position as to enable photography in the second size if said setting means changes the picture size to the second size in the state wherein the film is set at such a position as to enable photography in the first size, and for transporting the film backward and then forward to position the film at such a position as to enable photography in the first size if said setting means changes the picture size to the first size in the state wherein the film is set at such a position as to enable photography in the second size.

2. The camera capable of switching the picture size as defined in claim 1, wherein said picture size changeover feed control means controls said transport means such that the film is transported forward to be positioned at such a position as to enable photography in the second size by a shortage feed amount equivalent to ½ of a difference in film feed amount between the first size and the second size if said setting means changes the picture size to the second size in the state wherein the film is set at such a position as to enable photography in the first size, and that the film is transported backward by a larger amount than an excessive feed amount equivalent to ½ of a difference in feed amount between the first size and the second size and then the film is transported forward to be positioned at such a position as to enable photography in the first size if said setting means changes the picture size to the first size in the state wherein the film is set at such a position as to enable photography.

3. The camera capable of switching the picture size as defined in claim 1, wherein said first size is a normal size and the second size is a panoramic size.

* * * * *